(12) United States Patent
Teichert

(10) Patent No.: US 10,161,389 B2
(45) Date of Patent: Dec. 25, 2018

(54) DEVICE FOR ENABLING ACCESS TO A WIND TURBINE

(75) Inventor: Paul Teichert, Sydals (DK)

(73) Assignee: PP ENERGY APS, Nordborg (DK)

( * ) Notice: Subject to any disclaimer, the term of this patent is extended or adjusted under 35 U.S.C. 154(b) by 800 days.

(21) Appl. No.: 13/001,119

(22) PCT Filed: Jun. 18, 2009

(86) PCT No.: PCT/DK2009/000143
§ 371 (c)(1),
(2), (4) Date: Jan. 27, 2011

(87) PCT Pub. No.: WO2009/155917
PCT Pub. Date: Dec. 30, 2009

(65) Prior Publication Data
US 2011/0127108 A1    Jun. 2, 2011

(30) Foreign Application Priority Data

Jun. 26, 2008  (DK) ................................. 2008 00882
Sep. 29, 2008  (DK) ................................. 2008 01358

(51) Int. Cl.
*F03D 80/50* (2016.01)

(52) U.S. Cl.
CPC .............. *F03D 80/50* (2016.05); *Y02E 10/72* (2013.01)

(58) Field of Classification Search
CPC . B66D 1/54; B66F 11/044; E04G 3/30; E04G 1/20; A01M 31/02; F03D 1/003
(Continued)

(56) References Cited

U.S. PATENT DOCUMENTS

| 4,589,518 A * | 5/1986 | Kohzai | ..................... E06C 5/40 |
| | | | 182/19 |
| 7,004,285 B2 * | 2/2006 | Bailey | .................. B66F 11/046 |
| | | | 182/19 |

(Continued)

FOREIGN PATENT DOCUMENTS

| DE | 4339638 A1 | 5/1995 |
| DE | 29603278 U1 | 6/1996 |

(Continued)

OTHER PUBLICATIONS

International Search Report for PCT/DK2009/000143 dated Oct. 4, 2010.

*Primary Examiner* — Katherine W Mitchell
*Assistant Examiner* — Candace L Bradford
(74) *Attorney, Agent, or Firm* — McCormick, Paulding & Huber LLP

(57) ABSTRACT

A device 1 for enabling access to a rotor blade 54 of a wind turbine, said device being adapted for being moved in the longitudinal direction of the rotor blade 54, the device comprising
  a frame structure 2,
  means for supporting and guiding the device in relation to the rotor blade,
  means for lowering and/or lifting the device in relation to the rotor blade,
wherein said means for supporting and guiding the device in relation to the rotor blade are configured for contacting the rotor blade at regions
  at or near the front edge of the rotor blade and
  at or near the rear edge of the rotor blade, and
wherein said means for supporting and guiding the device in relation to the rotor blade are configured for being adjusted to the rotor blade during movement of the device in order to maintain controllable contact at said regions, and (Continued)

wherein said means for supporting and guiding the device in relation to the rotor blade comprises a plurality of contact means 12, 14 at least one of which is adapted for being omnidirectionally movable along the surface of the rotor blade 54 while said means for supporting and guiding the device in relation to the rotor blade are being adjusted to the rotor blade during movement of the device.

17 Claims, 26 Drawing Sheets

(58) Field of Classification Search
USPC .......................................... 182/19, 142, 145
See application file for complete search history.

(56) References Cited

U.S. PATENT DOCUMENTS

| | | | |
|---|---|---|---|
| 7,740,107 B2* | 6/2010 | Lemburg et al. ............ | 182/142 |
| 8,171,809 B2* | 5/2012 | Fritz .................... | G01M 11/081 |
| | | | 73/865.8 |
| 2006/0175465 A1* | 8/2006 | Teichert ............... | B66C 23/207 |
| | | | 244/33 |
| 2009/0020361 A1* | 1/2009 | Teichert .................. | E04G 3/30 |
| | | | 182/36 |
| 2009/0173573 A1* | 7/2009 | Teichert .................. | E04G 3/30 |
| | | | 182/19 |
| 2011/0303488 A1* | 12/2011 | Besselink .............. | B66F 11/04 |
| | | | 182/142 |
| 2012/0168252 A1* | 7/2012 | Bogaert ................. | E04G 3/325 |
| | | | 182/142 |

FOREIGN PATENT DOCUMENTS

| | | | | |
|---|---|---|---|---|
| DE | 19726408 C1 | * | 3/1999 | ............ F03D 11/00 |
| DE | 19726408 C1 | * | 3/1999 | ............ B66F 11/04 |
| DE | 19909698 A1 | | 4/2000 | |
| WO | 03048569 A2 | | 6/2003 | |
| WO | WO 3048569 A2 | * | 6/2003 | ............ F03D 11/00 |
| WO | WO-2004081373 A2 | * | 9/2004 | ............ E04G 3/30 |
| WO | WO 2004081373 A2 | * | 9/2004 | ............ F03D 1/00 |
| WO | 2004092577 A1 | | 10/2004 | |
| WO | 2005064152 A2 | | 7/2005 | |
| WO | 2007085265 A1 | | 8/2007 | |
| WO | WO-2007085265 A1 | * | 8/2007 | ............ E04G 3/30 |
| WO | WO 2007085265 A1 | * | 8/2007 | ............ E04G 3/30 |
| WO | WO-2012140278 A1 | * | 10/2012 | ............ B66F 11/04 |
| WO | WO 2012140278 A1 | * | 10/2012 | |

* cited by examiner

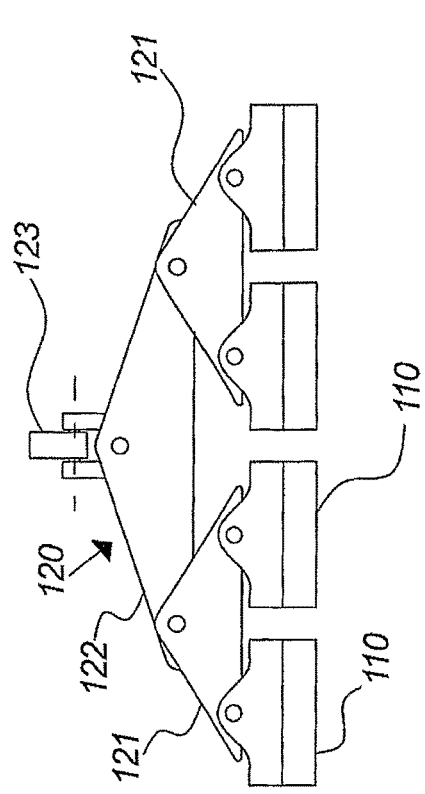
FIG. 16
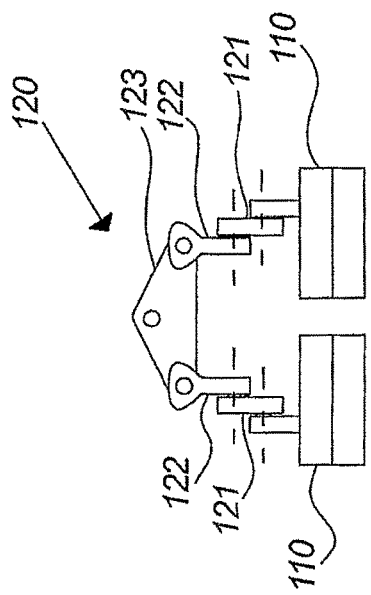
FIG. 17
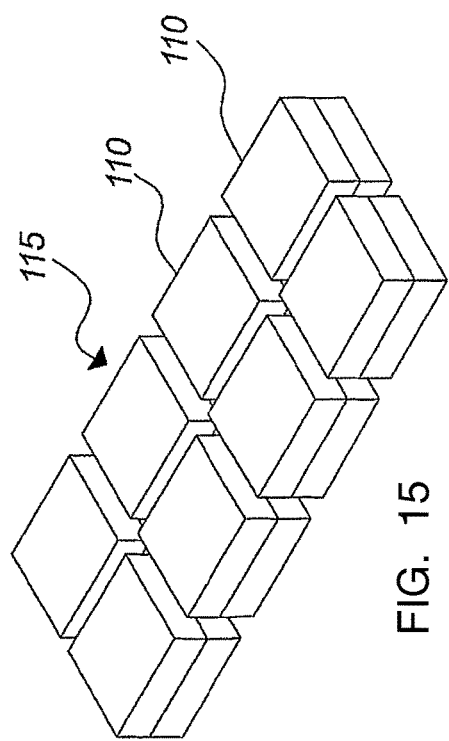
FIG. 14
FIG. 15

DEVICE FOR ENABLING ACCESS TO A WIND TURBINE

CROSS REFERENCE TO RELATED APPLICATIONS

This application is entitled to the benefit of and incorporates by reference essential subject matter disclosed in International Patent Application No. PCT/DK2009/000143 filed on Jun. 18, 2009, Danish Patent Application No. PA 2008 00882 filed on Jun. 26, 2008 and Danish Patent Application No. PA 2008 01358 filed on Sep. 29, 2008.

FIELD OF THE INVENTION

The present invention relates to a device for enabling access to a rotor blade of a wind turbine, which device is adapted for being moved in the longitudinal direction of the rotor blade, and wherein the device comprises a frame structure, means for supporting and guiding the device in relation to the rotor blade, and means for lowering and/or lifting the device in relation to the rotor blade.

The invention further relates to the use of a device for enabling access to a rotor blade of a wind turbine.

BACKGROUND OF THE INVENTION

Within the field of wind turbines it is necessary to perform work on parts that is situated at a considerable height above ground level (or sea level, when sea wind turbines are concerned) such as e.g. repair of rotor blades, the surface of these, surface treatment of rotor blades and the tower etc. Further, it has been recognized that it is advantageous or even necessary to clean such parts and in particular the rotor blades in order to maintain good results as regards the power efficiency. Further, it may be advantageous to perform other forms of maintenance in order to achieve good power production results and optimal economic results, such as e. g. surface treatments, inspection, etc.

In order to perform such work a number of hoisting arrangements have been proposed in the prior art.

A prior art hoisting arrangement is described in German utility model DE 296 03 278 U. According to this prior art arrangement the wind turbine is brought to a stop with one rotor blade pointing straight downwards, where after suspension means are fastened to each of the two other rotor blades near the hub of the rotor. A special work platform with a through-going slit at the bottom is fixed to these suspension means so that the rotor blade pointing downwards can be inserted into this slit. The work platform is subsequently being hoisted upwards in a stepwise manner, while the crew cleans the surface of the rotor blade manually, e. g. with one person located on each side of the rotor blade.

Even with such an arrangement, it is a time-consuming process to carry out a cleaning of the rotor blades of a windmill, just as such a known arrangement would probably require the use of machinery, such as a crane, for fixation of the special suspension means. Further, the platform itself will have a considerable weight and size, thereby leading to further costs and use of heavy machinery for lifting and lowering the platform.

Even further, the platform is hanging freely from the suspension means, which means that the platform is influenced by the wind and may be moved back and forth, e.g. in windy conditions. Thus, the platform may be a problematic and dangerous working place and it may be impossible to use the platform at even relatively modest wind speeds. Also, even though the platform has rollers at the edge of the slit to lessen damage to the rotor blade, such damages may nevertheless occur in certain conditions.

Devices of a corresponding kind are known from DE 199 09 698 Al and DE 43 39 638 Al, which are encumbered with the same disadvantages as those mentioned above, including that extensive use must be made of special material such as cranes, for example mobile cranes, or relatively comprehensive materials which, for example, are mounted on the turbine tower beforehand. In particular, these prior art arrangements may also be influenced by the wind and may be moved back and forth in relation to the rotor blade, e.g. in windy conditions and when being moved up and down. Thus, these prior art platforms may be problematic working places, it may be impossible to use the platforms at even relatively modest wind speeds, e.g. at relatively high wind turbines, and collisions with the surface of the rotor blade may occur, for example when the platforms are being moved up and down.

The above-mentioned prior art systems are generally not configured in a manner facilitating user-friendliness and do not provide the personnel with an optimal safety environment.

WO 03/048569 A2 describes a method and an apparatus for treatment of a surface of a rotor blade of a windmill, where the apparatus is being placed in such a manner that it is moveable in relation to the surface of a rotor blade, and said apparatus is being caused to move depending on a form of treatment determined by means for treatment mounted on, in or next to the apparatus. In this manner, various forms of treatment of a rotor blade may be carried out such as for instance washing, finishing, sealing etc.

Furthermore, WO 2005/064152 A2 describes a device for enabling access to a structure above ground level by lowering and/or lifting the device in relation to the structure, the device comprising a first endless frame structure defining an opening, wherein at least part of the first endless frame structure forms a track portion, the track portion being adapted to guide an, in relation to the track portion, movable object, such as a gondola, along the track portion.

Both of these prior art documents, i.e. WO 03/048569 A2 and WO 2005/064152 A2 relate to devices, where the devices are transferred to the rotor blade from below the rotor blade tip.

Still further, WO 2004/092577 A1 describes a method of servicing the outer components of a wind turbine such as the wind turbine blades and the tower with a work platform, said method comprising the steps of: positioning the work platform at the wind turbine tower and connecting the work platform to an upper part of the wind turbine with at least one cable. Further the method comprises the steps of raising the work platform with the cable and cable winding means to a position of use, and holding the work platform to the side of the wind turbine tower with holding means.

Even further, WO 2007/085265 A1 discloses a device for enabling access to a structure above ground or sea level, in particular a rotor blade of a wind turbine, by lowering and/or lifting the device in relation to the structure. The device comprises
 a frame structure,
 means for supporting the device in relation to said structure, and
 means for lowering and/or lifting the device in relation to the structure.
At least part of the frame structure of this prior art device comprises a track portion, the track portion being adapted to guide an, in relation to the track portion, movable object along the track portion. The means for supporting the device in relation to the structure are configured for positioning and guiding said device in relation to the structure, and the means for supporting the device in relation to said structure are configured for facilitating a movement of said device essentially in the longitudinal direction of said structure

SUMMARY OF THE INVENTION

It is an objective of the invention to provide an improved device for performing work at a wind turbine, e. g. on a rotor blade, where the device can be moved up and down a rotor blade, which is positioned in an essentially vertical position pointing downwards.

It is a further objective to provide such a device whereby improved user-friendliness and safety may be achieved and whereby access to virtually all parts of e.g. a rotor blade can be achieved.

It is also an objective to provide such a device that may be designed as a relatively light structure and in relatively light materials while maintaining safety standards and even provide improvements in safety aspects. With the increasing heights and sizes of wind turbines, the above-mentioned objectives have become increasingly more important, since the increase in wind turbine size requires corresponding service devices with increased sizes, whereby the need for a relatively uncomplicated and relatively light service device requiring only a minimum of resources has been further accentuated.

Even further, it is an objective of the present invention to provide such an improved device that may be moved up and down along the rotor blade in a safe and secure manner, guided by the rotor blade, and whereby the device is moving in a smooth manner along the rotor blade.

These and other objectives are achieved by the invention as explained in detail in the following.

In a first aspect, the invention relates to a device for enabling access to a rotor blade of a wind turbine, said device being adapted for being moved in the longitudinal direction of the rotor blade, the device comprising a frame structure, means for supporting and guiding the device in relation to the rotor blade, means for lowering and/or lifting the device in relation to the rotor blade, wherein said means for supporting and guiding the device in relation to the rotor blade are configured for contacting the rotor blade at regions at or near the front edge of the rotor blade and at or near the rear edge of the rotor blade, and wherein said means for supporting and guiding the device in relation to the rotor blade are configured for being adjusted to the rotor blade during movement of the device in order to maintain controllable contact at said regions, and wherein said means for supporting and guiding the device in relation to the rotor blade comprises a plurality of contact means, at least one of which is adapted for being omnidirectionally movable along the surface of the rotor blade while said means for supporting and guiding the device in relation to the rotor blade are being adjusted to the rotor blade during movement of the device.

Hereby, it is achieved that by means of the device the user may be able to reach or access all parts of the surface of a rotor blade of a wind turbine since the device can be moved up and down the rotor blade in a secure manner, guided by the rotor blade. The means for supporting and guiding the device in relation to the rotor blade are configured for preferably automatically adapting to the size and shape of the rotor blade, which vary considerably along the length, thereby facilitating that the rotor blade can be accessed along virtually the whole length. Furthermore, it is achieved that the device is supporting against parts of the rotor blade, which are suited therefore, i.e. regions at or near the front edge of the rotor blade and at or near the rear edge of the rotor blade, and the support is maintained at these regions, even though these regions moves in dependence on the variations of the size and shape of the rotor blade along its length. This is achieved due e.g. to the nature of the contact means, including the omnidirectionally movable characteristic that allows the contact means to move along e.g. the path of the rotor blade that is suitable as support for the device, without undue friction and with ease.

The device according to the invention that may e.g. carry a tool device and/or one or more persons, may be located in any vertical position along a wind turbine rotor blade, preferably controlled by a person at the device or at ground level, e. g. by controlling the means for lowering and/or lifting the device in relation to the structure. Further, the movable object may be controlled in such a manner that all parts of the rotor blade can be accessed.

Thus, a large and heavy platform is avoided, since a person using the device according to the invention may access virtually any desired position in relation to the wind turbine rotor blade. Hereby any necessary work may be performed using a relatively light construction. Further the safety standard is enhanced since a person using the device according to the invention may be secured in a reliable and dependable manner, e.g. secured to a work gondola by e.g. a safety line, and since such a person need not move around on a relatively large platform that may e. g. be swerving under the influence of the wind and may be bouncing against the rotor blade and/or against the wind turbine tower.

Furthermore, it is achieved that the device can be transferred to the rotor blade in a relatively uncomplicated manner, without using extensive machinery, while still keeping the device relatively small in relation to the size of the state of the art wind turbines.

As specified, said means for supporting the device in relation to the rotor blade are adapted for supporting the device at or near the front edge of the rotor blade and at or near the rear edge of the rotor blade.

Hereby, it is achieved that the device can travel along the rotor blade in a manner, where the surface of the rotor blade is not subjected to any harmful contact, i.e. since the device is designed for contacting the said parts of the rotor blade, which has the necessary rigidity and sturdiness.

According to a preferable embodiment, at least one of said plurality of contact means may be adapted for contacting the rotor blade at a plurality of points and/or at adjoining points.

Hereby, it is achieved that the contact means can move along the surface of the rotor blade while providing the necessary support against the surface of the rotor blade since the at least one contact means is adapted for contacting the rotor blade at a plurality of positions and/or at adjoining positions. Thus, the rotor blade will be able to withstand the load transferred to it by the contact means while it still will be possible for the contact means to be displaced along the surface with a minimum of friction.

According to a preferable embodiment, at least one of said contact means may comprise brush support means for contacting the rotor blade.

Hereby, it is achieved that the device may be supported against the rotor blade in a manner, whereby the load can be spread over a relatively wide area, e.g. due to the plurality of bristles used and/or due to a plurality of brushes being connected together or carried together by a common carrier, and whereby the contact means may readily move in any direction. The brushes may be with different lengths of bristles, the length of the bristles preferably corresponding to the shape of the rotor blade. Hereby, it is achieved that the device may be supported against the rotor blade in a manner, whereby the load can be spread over a relatively wide ared. Preferably, brush support means as used in e.g. the conveying field may be used, for example industrial brushes as supplied by the company August Mink KG, Germany.

According to a further preferable embodiment, at least one of said contact means may comprise belt, drum, roller or similar support means for contacting the rotor blade.

Hereby, it is achieved that the device may be supported against the rotor blade in a manner, whereby the load can be spread over a relatively wide area.

According to a still further preferable embodiment, said belt, drum, roller or similar support means for contacting the rotor blade may comprise a plurality of parallel belts, chains, drums, rollers or similar means.

Hereby, it is achieved that the device may be supported against the rotor blade in a manner, whereby the load can be spread over a relatively wide area.

Preferably, at least one of said contact means may comprise a plurality of balls, rollers or the like.

Hereby, it is achieved that the device may be supported against the rotor blade in a manner, whereby the load can be spread over a relatively wide area and whereby the contact means may readily move in any direction.

Alternatively, at least one of said contact means may comprise fluid means, e.g. gas, air, for example in the form of pneumatic or air cushioning means, liquids, etc. for facilitating contact to the surface of the rotor blade.

Hereby, it is achieved that the device may be supported against the rotor blade in a manner, whereby the load can be spread over a relatively wide area and whereby the contact means may readily move in any direction, i.e. omnidirectionally.

According to a particular preferable embodiment, said means for supporting and guiding the device in relation to the rotor blade may comprise means such as strain gauges, weighing cells, etc. for determining contact load at said regions of the rotor blade, thereby facilitating detection and/or measurement of unbalance, variations in rotor blade dimension, e.g. width, wind pressure, etc.

Hereby it is achieved that the load put onto the surface of the rotor blade by the individual contact means can be determined and that the device can be adjusted, e.g. the means for supporting the contact means, in such a manner that the load is kept below predetermined limits, that all contact means take a part in the support, i.e. no un-loaded contact means, and that the load is distributed evenly or essentially evenly. Thus, a smooth movement of the device, when it is moved along the rotor blade, is achieved when the load or pressure of each of the plurality of contact means are controlled, since the friction correspondingly is controlled. Thus, abrupt movements, abrupt stops etc. can be avoided, which furthermore enhances the safety when using the device.

According to a further particular advantageous embodiment, said means for supporting and guiding the device in relation to the rotor blade may comprise means for detecting an edge of the rotor blade.

Hereby, it is facilitated in an expedient manner that the contact made by the contact means are established and maintained within the above-mentioned regions, since these can be determined in relation to the edge or edges of the rotor blade.

Advantageously, said means for detecting an edge of the rotor blade may comprise measuring or detecting means such as for example optical sensing means, e.g. laser means, photo cells, optical scanning means, etc., radiation means such as X-ray means, sonic detecting means, e.g. ultrasonic means, etc., radar means, etc.

Hereby, the edge or edges of the rotor blade can be detected with a large degree of accuracy and by means of proven components and systems.

Advantageously, the device may comprise control means for controlling said means for supporting and guiding the device in relation to the rotor blade on the basis of input signals provided by said means for determining contact load at said regions of the rotor blade and/or input signals provided by said means for detecting an edge of the rotor blade.

Hereby it is achieved that the device can be controlled to move along the rotor blade in an automated manner, whereby the contact means are kept within the desired regions and whereby the means for supporting and guiding the device in relation to the rotor blade are controlled in such a manner that the load put onto the rotor blade by the contact means are within predetermined limits, whereby also a preferable balance is achieved and whereby a reliable, safe and user-friendly operation of the device is achieved, e.g. a movement of the device along the rotor blade, which does not involve jerks, abrupt movements, abrupt stops, etc.

Preferably, said frame structure may have an open configuration or is adapted for being opened, e.g. by having a releasable frame part and/or one or more frame parts that are pivotal.

Hereby, it is achieved that the device can readily be transferred to the rotor blade at a convenient place along the length of the rotor blade in a relatively simple manner instead of being placed at the rotor blade at the tip of the blade, where the distance to the tower is relatively large, thereby making such an operation relatively complex, when the size of currently used wind turbines is taken into consideration. Furthermore, as regards a frame structure that is configured for being opened, it is noted that when such a frame structure is closed again, it may essentially and functionally be defined as being an endless frame structure and that the track essentially may extend along such an endless frame structure, whereby access can be gained in a 360° configuration.

Preferably, said means for supporting and guiding the device in relation to the rotor blade may comprise a rear guide and support arrangement comprising at least one arm for establishing contact at said regions at or near the rear edge of the rotor blade.

Preferably, said rear guide and support arrangement may be movable in the longitudinal direction of the device.

Advantageously, said rear guide and support arrangement may comprise at least two arms for establishing contact at said regions at or near the rear edge of the rotor blade, wherein said arms may be pivotable in relation to the frame structure, whereby variations in the width of the rear edge of the rotor blade can be accommodated and whereby further position of the frame structure in relation to the rotor blade is adjustable.

Preferably, said means for supporting the device in relation to said rotor blade may comprise a front guide and support arrangement comprising one or more of said plurality of contact means, and wherein said front guide and support arrangement may be movable, e.g. comprising one or two pivotable arms or the like for facilitating opening and closing of said frame structure.

According to a further particular advantageous embodiment, the contact means, e.g. belts or the like, of said front guide and support arrangement may comprise contact detection means, for example sensors, switching means, etc., for detecting the contact established between the contact means and the rotor blade.

Hereby, it is achieved that it is detected if e.g. the contact means, which normally supports against the rotor blade on the front side, is not in contact with the surface of the rotor blade, which means that the contact means, which supports against the other side, is taking the full load of the front part of the frame. This has the undesired effect that the contact pressure may be undesirable high and furthermore that the frame may abruptly move to a position where both contact means are supporting again, which is undesirable for several reasons, one of which being the work comfort of the person(s) located in the e.g. work platform(s), since such a abrupt movement will be at least uncomfortable. Since such an undesirable situation can be detected in accordance with this embodiment, measures can be taken to correct the situation and achieve that e.g. both front contact means are in a correct contact with the rotor blade.

Preferably, said front guide and support arrangement may be adapted for being tilted up or down in order to allow said contact means to adapt to the direction of movement along the front part of the rotor blade.

Hereby, it can be achieved that the front contact means can be guided to maintain a desired contact with the rotor blade in spite of the changing width of the rotor blade front, when the device is moving up or down, which may require that the suspension arrangement, e.g. the arms of the front guide and support arrangement are adjusted, for example a small angle up or down.

Advantageously, the device may further comprise one or more fenders on the inside of the frame structure. Preferably, the fenders are placed to face each other. Hereby, it can be achieved that any direct contact between frame and rotor blade is as gentle as possible.

Preferably, the frame or the fenders may comprise means for determining and or measuring the contact load. Hereby, measures can be taken to avoid a situation, where the rotor blade becomes squeezed or wedged in the frame.

Preferably, the fenders may have the shape of cylinders or rollers.

Preferably, the device may further comprise means for supporting the device in relation to a wind turbine tower, where said means for supporting the device in relation to the wind turbine tower are configured for displacing the device in relation to said wind turbine tower, e.g. when the device is transferred to or removed from the rotor blade of a wind turbine.

Hereby, the lifting and lowering of the device along the tower is facilitated and furthermore, the operations performed when the device is transferred to the rotor blade or returned to the tower again are facilitated.

Preferably, said means for supporting the device in relation to the wind turbine tower may be configured for adjusting the position, e.g. the angle of the device in relation to the wind turbine tower.

Hereby, it is achieved in a relatively simple manner that the device can be controlled with great accuracy, when for example it has reached a height where it is desired to contact the rotor blade. This may be of particular importance when operating in windy conditions.

Advantageously, said means for supporting the device in relation to the wind turbine tower may comprise means for measuring the support load, for example for each of the tower support arms, e.g. in order to determine load distribution between two or more tower support arms or the like.

Hereby, it can be determined whether for example two tower support arms carry essentially the same load or if for some reason, e.g. wind pressure, the influence of the hoisting means, etc., the load is (undesirably) uneven, whereby corrective control steps can be taken.

Preferably, at least part of the frame structure comprises a track portion, where the track portion is adapted to guide an, in relation to the track portion, movable object along the track portion.

Still further, as the device may comprise an object carried by the track, said object comprising a work platform or a gondola adapted to carry one or more individuals and/or a tool, a robot, an apparatus etc. for performing an operation on the rotor blade in a more or less automated manner.

Hereby, the desired flexibility of the device is achieved in an expedient manner since the object may be moved along the circumference of the rotor blade, whereby the complete surface of the rotor blade can be accessed, e.g. via the track that may be designed in various manners.

In connection herewith it is noted that such an object, e.g. a work platform or a gondola, may be carried by the track in such a manner that the e.g. gondola is hanging down from the track, whereby a person in the gondola can effectively treat, inspect, repair etc., the surface of the rotor blade essentially below the frame structure of the device. Thus, it will be understood that even the outer part of the rotor blade, e.g. the tip of the rotor blade can be treated, inspected, repaired, etc. in this manner, while the device is supported by the rotor blade. However, according to a further embodiment, the object, e.g. the gondola may be carried by the track in such a manner that the e.g. gondola is essentially located above the track and/or the frame structure, whereby parts of the rotor blade above the frame structure can be treated, inspected, repaired, etc. Such an embodiment has for example the advantage that upper parts of the rotor blade, e.g. even parts close to the hub can be treated.

Still further, the object may comprise two or more work platforms, gondolas, tools, robots, apparatuses, etc.

Advantageously, said two or more work platforms, gondolas, tools, robots, apparatuses, etc. may be independently movable and one of said two or more work platforms, gondolas, tools, robots, apparatuses, etc. may be configured as a master unit and the other(s) may be configured as slave unit(s), and wherein further said configuration may be reversed, e.g. in case of an emergency situation, for example if the power should be disconnected to the master unit, if the person in the master unit should be indisposed, etc.

Hereby, it is achieved that e.g. two persons or more may be working individually, e.g. at each side of the rotor blade, whereby the device can be utilized in a fully efficient manner. Furthermore, it is achieved that the primary control of the device can take place from the master unit, e.g. the control of the height of the device, the transfer to and from the rotor blade etc., which evidently can not be controlled by a plurality of persons or objects in an efficient manner, whereas the control of the position of the individual platforms along the perimeter of the rotor blade, the angular position of the work platforms etc. can efficiently be performed from each of the individual units.

Advantageously, said two or more work platforms, gondolas, tools, robots, apparatuses, etc. may be configured for being connected together to form a single gondola, work platform, tool, robot, apparatus, etc. Hereby, a flexible design of the device is achieved, allowing the objects, e.g. work platforms, tools, robots, apparatuses, etc. to be used in any desired manner and in view of the actual circumstances.

Preferably, the object may comprise seating for one or more individuals.

Advantageously, the object may comprise control means for controlling the position of the object in relation to the track portion and in relation to the rotor blade.

Hereby, the person or the persons using the device may control the device and in particular their own position, e. g. work position in relation to e.g. the surface of a rotor blade, in an optimal manner. Further, the work platform may comprise control means for controlling the lifting/lowering and the positioning in relation to the structure, which control means may be in the form of a joystick or the like and by means of which any controllable part may be individually controlled and/or controlled simultaneously with other parts. Further, it is noted that a gyroscopic arrangement may be included in the control system.

Advantageously, the control means for controlling the position of the object in relation to the track portion and in relation to the rotor blade may comprise a rotation, e.g. 360°, around the axis of the object and a rotation, e.g. of 180°, by means of an eccentric suspension in relation to the track portion.

Further, the object, e.g. one or more work platforms, gondolas, tools, robots, apparatuses, etc., may comprise load detection means, e.g. for each work platform, gondola, tool, robot, apparatus, etc. which load detection means may provide input for control and/or safety means.

In accordance with a further preferable embodiment, said means for lifting and/or lowering the device in relation to the rotor blade may comprise hoisting means having power means such as electric motors, electric, electronic, hydraulic and/or pneumatic means and said hoisting means may be adapted for climbing up and down a cable or said hoisting means may be adapted for accumulating the cable, e.g. drum hoisting means.

Hereby, the device will be able to lift and/or lower itself without power assistance from e. g. a hoist located at the wind turbine tower, at a vehicle or at a vessel. Thus, the device will be able to operate independently, e. g. without concern for power assistance from other devices. This further enhances safe operation since accidents caused by a power failure at a ground vehicle or at a vessel are prohibited. Particularly when operation at sea is concerned, e. g. at sea wind turbines, such an independent configuration is preferable since a support vessel may be unstable, e. g. subjected to waves, current, wind etc. Thus, an arrangement at sea where a vessel provides the elevation by e.g. hoist (s) located on the vessel is prone to accidents and malfunction, and therefore a device comprising power means as mentioned above is advantageous not only in general but especially at sea.

Further, it is noted that even when power supply to such a device is subjected to failure, e. g. when electric power is cut off, a device according to the invention will be able to be manually operated, e.g. to be hoisted to the ground and will in general present a safe work tool for all involved, in particular persons occupying the device.

Advantageously, the device may further comprise control means for controlling the lifting and/or lowering means.

Such control means may be controlled from a platform as explained above or from e.g. ground level, for example when an automated operation is taking place.

According to a particular advantageous embodiment said means for lifting and/or lowering the device in relation to the rotor blade may comprise a plurality of hoisting means, wherein one of said plurality of hoisting means is a master hoisting means and wherein the other/others of said plurality of hoisting means is/are controlled in dependence of the master hoisting means.

Hereby it is achieved that the device can be lifted and lowered in such a manner that the device is maintained in a desired state, e.g. horizontally or at a desired angle while being moved up and down and/or that furthermore the load taken by the individual hoisting means are within predetermined limits.

It will be understood, though, that the hoisting means may also be synchronized in relation to each other.

According to a further advantageous embodiment the device may comprise measuring means, e.g. weighing cells, strain gauges, etc. for measuring the load for the hoisting means or for each of a plurality of hoisting means.

Even further, the device may comprise measuring means, e.g. encoders, laser measuring means, etc., for measuring or estimating e.g. the position of the device, the lifting and lowering distances and/or velocity for each of a plurality of hoisting means.

Thus, it will be understood that the hoisting means may be adapted for measuring or calculating the length of the wire, line or cable in order to determine the actual altitude of the device. A calibration of these means may take place, when the device is placed e.g. at ground level.

According to a still further advantageous embodiment, the device may further comprise means for automatically adjusting said hoisting means, e.g. automatic levelling means, in order to provide a desired position, e.g. a horizontal position of the frame structure.

Advantageously, the device may be adapted to assist individuals and/or facilitate the use of automated equipment such as robots in performing inspection, work, repair, surface treatment etc. on a rotor blade of a wind turbine.

Preferably, said device may comprise a control system for automatically controlling actuators, hoisting means etc. of the device on the basis of control input from e.g. gyroscopic sensor(s), pressure sensor(s), optical sensor(s) such as laser sensor(s), strain gauge sensor(s), contact sensor(s) and/or other sensors, detectors and/or measuring means.

According to an advantageous embodiment the control system may be configured for limiting the speed, with which the device is lowered and/or lifted, when the device is within a predetermined distance from the ground or another base level or within a predetermined distance from e.g. the nacelle.

When moving up and down along the wind turbine tower, it is desirable to move as fast as possible in view of the considerable distances, e.g. in order to minimise the non-productive time used for moving up and down. However, in order to enhance the safety of the persons involved, the speed of the device may preferably be limited when the device is getting near the ground, e.g. when the device is within a few meters to the ground in order to avoid a hazardous collision with the ground, which in most cases will be a collision between the ground and the gondola(s) and the person(s) situated in the gondola(s). The distance to the ground may be determined or calculated by means of the hoisting means, which as mentioned above may comprise means for measuring or calculating the length of the wire, line or cable in order to determine the actual altitude of the device. However, also special measuring means such as laser distance means located at the device may be used for this safety related arrangement, whereby the ground level can be determined or detected with great accuracy.

According to a further advantageous embodiment, said means adapted for supporting the device in relation to a rotor blade of a wind turbine may be displaceable, e.g. in the lateral direction and/or the longitudinal direction of the device.

Hereby, the device can readily travel along the length of the rotor blade, while the support means are automatically adapted to the actual size and/or shape of the rotor blade. Furthermore, the transfer of the device from the tower to the blade is facilitated in this manner.

Preferably, said front guide and support arrangement may be movable in the longitudinal direction of the device.

Hereby, the control of the position of the contact means in relation to width and/or position of the rotor blade is facilitated.

According to a further aspect of the invention, said means for supporting the device in relation to a nearby structure may be configured for supporting against said nearby structure at least at two points in the vertical direction, and wherein means for supporting the device at least at one of these points are adjustable in relation to the nearby structure, e.g. the surface of a wind turbine tower.

Hereby, it is achieved that the device can be transported along the surface of the tower, even when the surface comprises obstacles or the like, for example in form of flanges or the like or in the form of various equipment such as for example antennas that are located at the tower.

Preferably, the frame structure may form an essentially elongated structure.

Hereby, the device can efficiently be used for e.g. servicing a wind turbine rotor blade, since the elongated configuration provides the possibility of reaching all parts of the surfaces of the rotor blade, when the device is moved along the rotor blade. It is noted that even though the frame structure has been exemplified as having an essentially U-shaped form, various other forms are possible. It should be mentioned that for example rectangular, triangular, circular, oval forms etc. may be used as well. Further, forms having an L-shape, V-shape, etc. may also be used, and it is noted that forms allowing access to a restricted part only of the rotor blade, for example only one side of the rotor blade, are possible and are within the invention as characterized in the claims.

Advantageously, the device may be adapted to assist individuals in performing inspection, work, repair, surface treatment etc. on a rotor blade of a wind turbine.

According to a particular advantageous embodiment, said one or more objects guided by said track portion, e.g. an object in the form of a work platform, a gondola, a tool, a robot, an apparatus, etc. may comprise means for adjusting the position in relation to said track portion, e.g. transverse to the direction of the track portion.

Hereby, it is achieved that in instances, where an object being guided by the track portion is not positioned optimally in relation to the rotor blade, e.g. at a suitable work distance, the object can be displaced until it reaches the desired distance. This may be particularly important, where the track portion has a gap, for example at an open end of the frame structure of the device, e.g. at the front edge of the rotor blade. The adjustment or displacement of the object may be achieved in various manners, for example by having the object being suspended in an S-shaped suspension, which can be rotated, whereby the adjustment is performed in a circular motion. Further the adjustment can be performed via a linear movement, for example using a linear actuator, a beam structure or the like Expediently, said means for lifting and/or lowering the device in relation to the rotor blade may be connected to a plurality of lines, wires or the like.

Such wires or lines etc. may be connected to any suitable location on the wind turbine, e.g. the nacelle, the hub, the tower etc, and they may be permanently fixed. Furthermore, it is noted that in accordance with the invention, the device can be operated using three such lines or wires, two connected at or near the rear of the device and one connected to a point along the length of the frame structure, preferably at the end of the frame facing away from the tower, whereby a triangular suspension is achieved. As it is explained herein, the device may be balanced, e.g. by adjusting the position of one or both of these connection points, for example on the basis of measured parameters and/or gyroscopic inputs. Further, it is noted that by such an arrangement it is achieved that during the operation of the device, the lines or wires will not get in contact with the rotor blade.

According to a further embodiment, the device may further comprise means for changing the direction of one or more of the lines or wires, by means of which the device is hoisted, lifted and/or lowered with, thereby altering the balance of the device.

Hereby, a balancing of the device as described above is facilitated.

According to a still further aspect of the invention, the device may further comprise dampening means for performing a dampening action of the device in relation to said structure, e.g. a wind turbine rotor blade or tower.

Since the device may be used and operated at considerable heights, it is apparent that the structure itself, e.g. the wind turbine, and the device, for example the frame structure, a work platform, a gondola etc. will be affected by the environment, e.g. influenced by the wind, turbulences, etc. In order to counteract such influences, the device according to any of the embodiments described herein may be equipped with means for effecting a dampening of the undesired influences. Such dampening means may be passive, but preferably or in addition to passive dampening means active dampening means may be used. Such active dampening means may be controlled by control means, for example integrated with the central control means for the device, and the control of the active dampening means may take place on the basis of input signals from e.g. sensor means, by means of which for example wind speed, turbulence, vibrations etc, may be measured. Hereby it is achieved that the mass of the device including work platform, gondola, personnel, tools, etc. may be used to dampen the movements of the structure itself, for example a rotor blade, in such a manner that even in windy conditions the structure, e.g. a rotor blade, will be stable and relatively immobile. Hereby, the working conditions including the safety of the personnel are also improved considerably.

Expediently, said dampening means may be passive dampening means.

Preferably, said dampening means may be active dampening means, whereby an enhanced efficiency is achieved.

Advantageously, said active dampening means are controlled by control means.

Advantageously, said active dampening means may be controlled on the basis of input signals from e.g. sensor means such as e.g. wind sensors, accelerometers, etc.

Expediently, said device may comprise a control system for automatically controlling actuators, hoisting means etc.

of the device on the basis of control input from e.g. gyroscopic sensor(s), pressure sensor(s), optical sensor(s), strain gauge sensor(s) and/or other sensors.

Hereby, at highly automated operation of the device is achieved and furthermore, an enhanced user friendliness and an enhanced efficiency is achieved since for example the user need not to attend to various compensative control operations in order to counteract changing wind, changing balance as the device is moved up and down etc., but can concentrate on the work that has to be performed.

According to a further advantageous embodiment, said device may be adapted for being permanently fixed at said structure, e.g. at a nacelle of said wind turbine, and adapted for being operated by lowering and transferring the device to a rotor blade.

Hereby, a practical solution is provided for the wind turbines that are being built and will be built with considerable heights and sizes, where the permanent allocation of a device in accordance with the invention is justified, e.g. when taking into account the time and resources needed for lifting a device to the necessary level, e.g. 200-400 meters or more above ground level.

Furthermore, the invention relates to a use of a device for enabling access to a rotor blade of a wind turbine, whereby
- a device is placed near said wind turbine essentially at ground or sea level,
- the device is lifted in relation to said wind turbine by means of at least one line, wire or the like connected to said wind turbine,
- when the device has reached a suitable level, the rotor blade is contacted by support means at an edge of the rotor blade, which support means are movable in relation to said device,
- at a higher level contact to the rotor blade is established by support means at both edges of the rotor blade, and
- the device is lifted and/or lowered in relation to the rotor blade while supported and guided by said support means at regions
  - at or near the front edge of the rotor blade and
  - at or near the rear edge of the rotor blade,
- said support means comprising a plurality of contact means, at least one of which is adapted for being omnidirectionally movable along the surface of the rotor blade while said means for supporting and guiding the device in relation to the rotor blade are being adjusted to the rotor blade during movement of the device.

Hereby, it is achieved that access to a rotor blade at a wind turbine can be effected in an expedient manner using a device for performing e.g. service operations, when the device is lifted along the rotor tower and transferred to the rotor blade not at the tip of the rotor blade, but at a level, where the distance from the tower to the rotor blade is convenient. Hereby, a number of advantages are achieved, including reduced costs and resources.

Preferably, one or more objects in the form of a work platform, a gondola, a tool, a robot, an apparatus, etc. may further be attached to a track portion of said device before lifting said device in relation to the wind turbine.

Hereby, it is achieved that the device may be made ready for operation in an expedient manner, for example when the device is transported to the actual work site on e.g. trailer or a similar transport means, the frame of the device is connected to the lines or wires, lifted a suitable distance and the necessary number of work platforms, gondolas, tools, robots, apparatuses, etc, e.g. one or two, is/are connected to the track portion, before the device if lifted upwards. Similar applies when the device is returned to the ground.

Expediently, said device may be supported in relation to the tower of the wind turbine or in relation to cables extending along the tower while being lifted or lowered, when the device is not supported and guided by the rotor blade.

Hereby, it is achieved that the device is lifted and/or lowered in a stable and controlled manner.

Advantageously, said step of establishing contact to the rotor blade at both edges of the rotor blade may be performed at a level at or near "chord max"-level, and/or at a level where a minimum distance, e.g. a safe and suitable distance, between the front edge of the rotor blade and the tower exists.

Hereby, the transfer of the device can be effected in a particular simple manner and in a manner whereby the size, weight, complexity etc. of the device in relation to the size of the wind turbine is minimized.

Expediently, the wind turbine may initially be arranged with a rotor blade essentially vertical and with the rear edge of the rotor blade near the tower.

Hereby, optimal working conditions are achieved, e.g. with the edge of the rotor blade facing any possible wind and whereby the device may expediently contact the edge as soon as possible when being lifted upwards, whereby increased stability is achieved.

According to a further preferable embodiment, the device may initially be provided on a vehicle such as a trailer, whereafter the hoisting means of the device may be connected to a plurality of cables of the like, which are connected to or at the upper part of the wind turbine.

According to a particular preferable embodiment, the device may initially be connected to the vehicle, e.g. the trailer, by a controllable winch, by means of which the movement towards the tower of the wind turbine may be controlled at an initial step.

According to a further preferable embodiment, the device may be controlled, e.g. at an initial step, to automatically perform a levelling procedure, before the device is being lifted up along the tower of the wind turbine.

According to a still further preferable embodiment, measurements may be made at the device or at the hoisting means, e.g. by means of encoders, laser measuring means, etc., in order to determine the position, the distance lifted or lowered, the velocity, etc., and whereby comparisons further may be made with e.g. desired parameters and/or whereby the actual position and/or balance of the device may be determined.

According to a particular embodiment, one or more objects, e.g. two or more work platforms, gondolas, tools, robots, apparatuses, etc. may be moved independently along the track portion, wherein one of said two or more work platforms, gondolas, tools, robots, apparatuses, etc. may configured as a master unit and that the other(s) may be configured as slave unit(s), and wherein further said configuration can be reversed, e.g. in case of an emergency situation.

According to a further embodiment, said two or more work platforms, gondolas, tools, robots, apparatuses, etc. may be independently movable along the track portion, but that in dependence on the level of the device, movement of one or more of said two or more work platforms, gondolas, tools, robots, apparatuses, etc. may be restricted by said control system, for example at levels near the tip of the rotor blade, where movement along the part of the track portion, which is facing the tower of the rotor blade is prohibited.

BRIEF DESCRIPTION OF THE DRAWINGS

The invention will be described in detail in the following with reference to the drawings, in which FIGS. 11-27 show various contact means and associated devices for use in connection with embodiments of the invention.

DETAILED DESCRIPTION OF THE PREFERRED EMBODIMENTS

Figure 1:
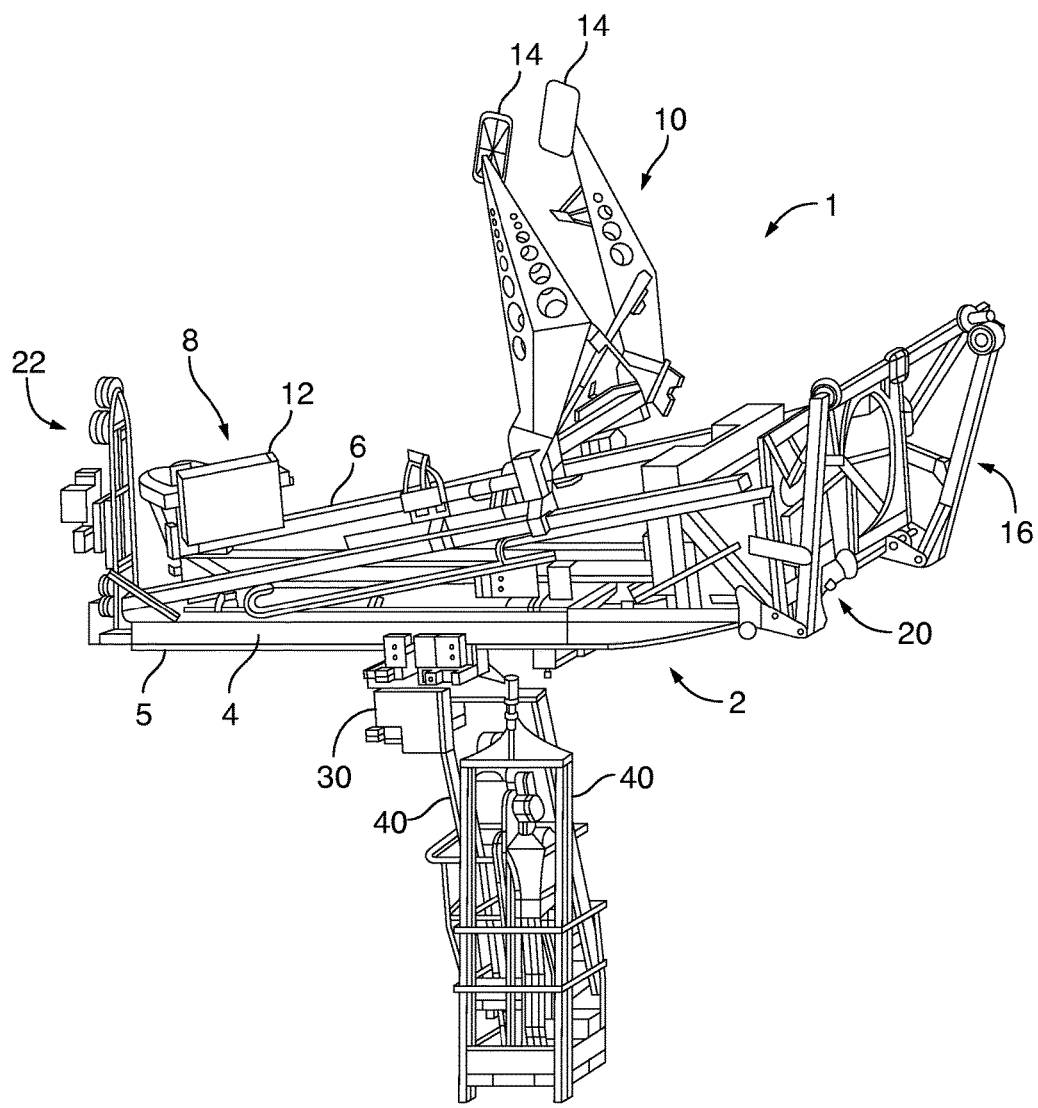
FIG. 1 shows a device according to an embodiment of the present invention in a perspective view.

In FIG. 1 a device 1 according to an embodiment of the present invention is shown in a perspective view. This device 1 comprises a frame 2, which in general has a lower frame structure 4, e.g. in the form of a beam, a beam structure, a lattice structure or the like and an upper frame structure 6. The frame 2 according to the present embodiment has a generally U-shaped structure. The lower frame structure 4 is provided with a track 5 for carrying and guiding at least one gondola 40, work platform or the like, which will be described in further detail later on.

At one end of the device 1 a front guide and support arrangement 8 is located, which serves the purpose of supporting and guiding the device in relation to the front of a rotor blade as it will be described in detail below. As shown, the front guide and support arrangement 8 is provided with front contact means 12, e.g. in the form of belts, drums, rollers or the like to support against the rotor blade. As it will be explained below, the front guide and support arrangement 8 is adapted for being opened in such a manner that a rotor blade can enter into the open end of the generally U-shaped structure of the frame 2.

A rear guide and support arrangement 10 is connected to the upper frame structure 6 in such a manner that it can be displaced along the upper frame structure 6 in order to adapt the device 1 to the size of the rotor blade. The rear guide and support arrangement 10 is provided with two rear contact means 14 for supporting and guiding the device 1 in relation to the rear part of the rotor blade, which will be described in further detail later on.

The device 1 is further provided with a plurality of hoisting means for lifting and lowering the device in relation to the wind turbine tower and in relation to the rotor blade. As generally indicated in FIG. 1 front hoisting means 22 are provided at one end of the device and rear hoisting means 20 are located at the other end, e.g. the end facing the tower. These hoisting means, which may be electrically, electronically, hydraulically or pneumatically driven, comprise lines or wires (not shown in FIG. 1), which may be connected to fixing points at e.g. the top of the wind turbine tower, the nacelle, etc. Preferably, three hoisting means may be used, two rear hoisting means 20 and one front hoisting means 22. These hoisting means will be described in detail later on.

At the end of the device 1, which is intended to face the tower, a tower support arrangement 16 is located, which in general serves the purpose of supporting the device against the side of the wind turbine tower, while the device 1 is being lifted and lowered, and further it may assist in bringing the device towards the rotor blade, as it will be explained later on.

As mentioned above, the lower frame structure 4 is provided with a track 5 for carrying and guiding at least one gondola 40, work platform or the like. As shown, the gondola 40 is carried by a trolley 30, which can move along the track 5. The gondola 40 is supported in such a manner that the gondola can be located at preferably any position along the frame 2 and with a desired position in relation to a rotor blade, to which the device 1 is supported, as it will be explained later on. As indicated in FIG. 1, two gondolas 40 can be carried by the device 1, each carried by a trolley 30.

Figure 2:
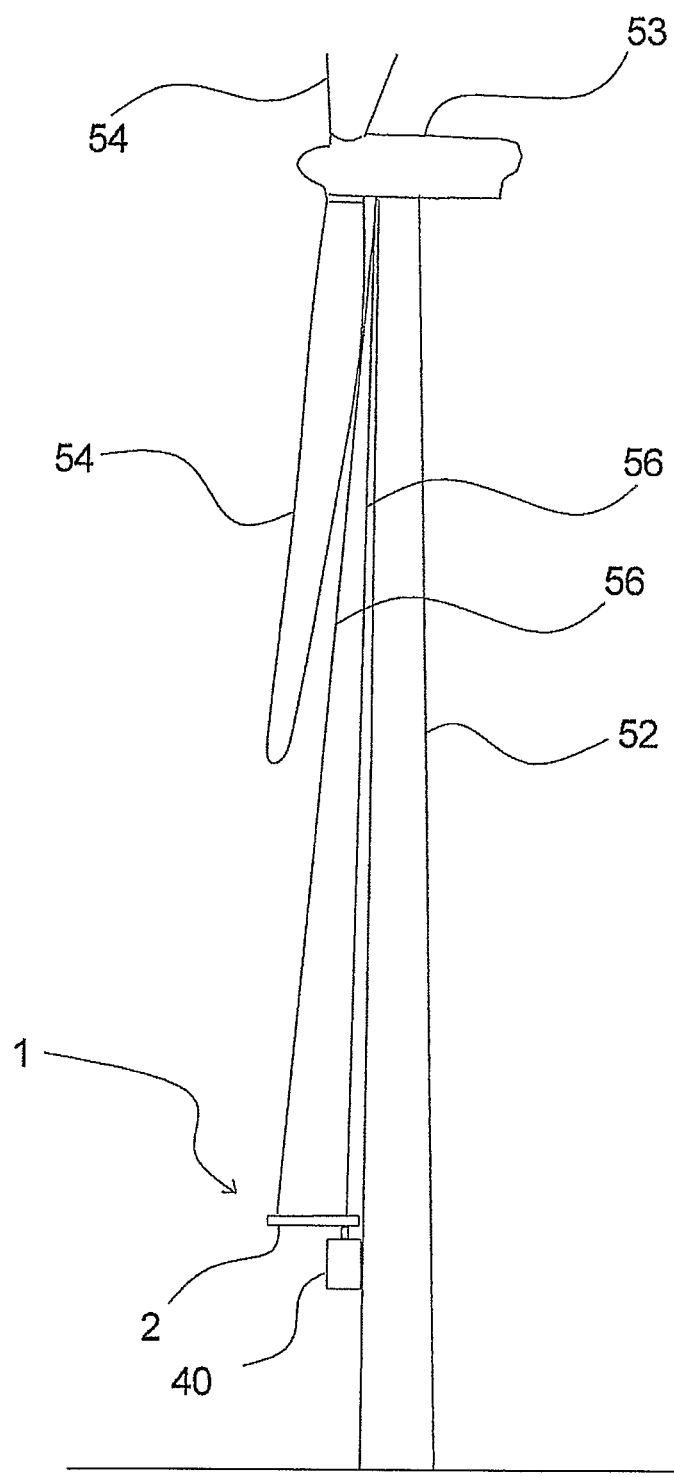
FIGS. 2-5 show the functional features of the device according to this embodiment in connection with a wind turbine.

In order to further clarify the features of the device according to the invention, the use of the device 1 will be explained in general with reference to FIGS. 2-5, which illustrate the device 1 in a schematic manner, e.g. showing the frame 2 with a gondola 40 placed underneath the frame. In FIG. 2 it is shown that the device 1 has been placed at a wind turbine, e.g. near the tower 52. The rotor blades 54 have been stopped in a position with one of the blades pointing essentially downward and with the rear edge of the blade 54 facing the tower 52. The wires or lines 56 have been connected to fixing points at the top of the wind turbine, e.g. at the tower 52, at the nacelle 53 or at the hub, and the device 1 is being elevated as shown in FIG. 2, i.e. using the hoisting means 20 and 22. The device may be supported against the tower 2 during the elevation, e.g. by means of the tower support arrangement 16, rollers or the like placed on the frame 2 and possibly on the gondola 40.

Figure 3:
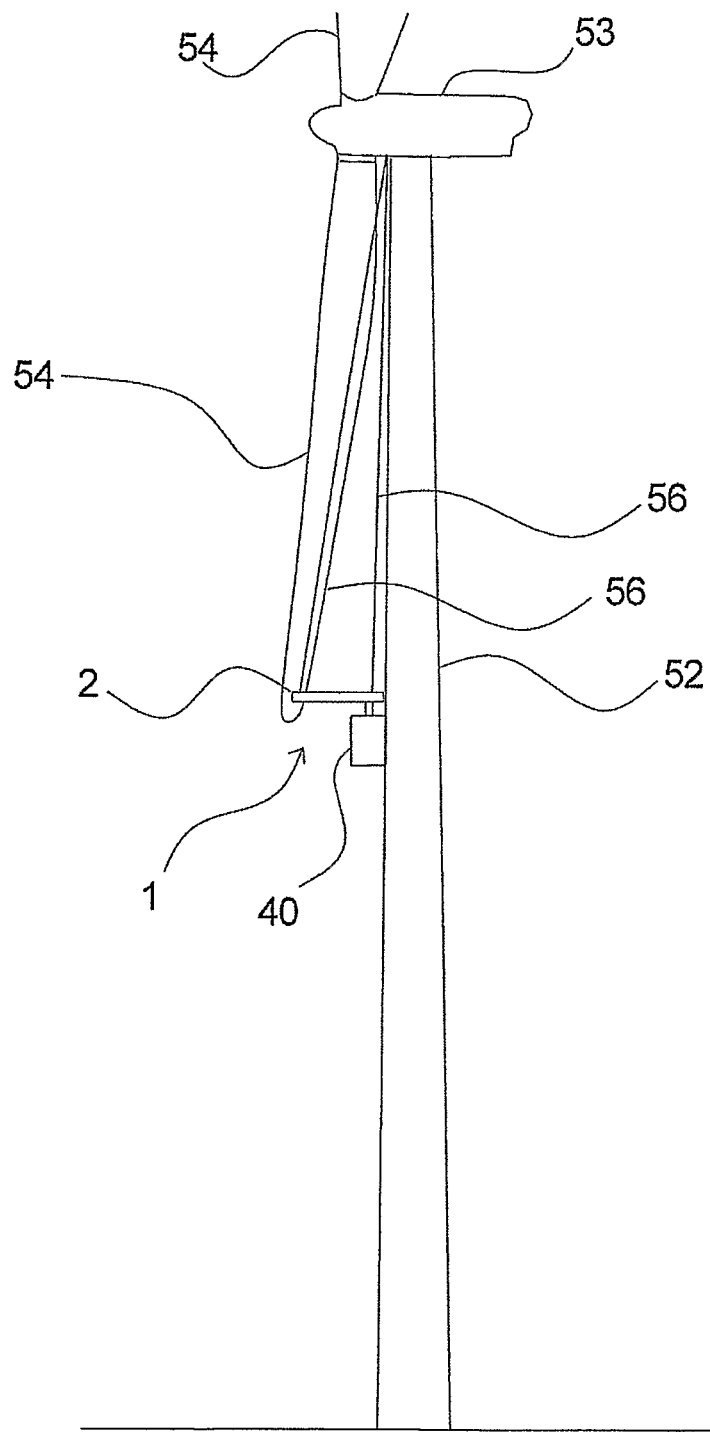

When the device is being elevated, the frame is open in order to be able to receive the rotor blade, preferably at least when the device reaches the level of the tip of the rotor blade 54 as shown in FIG. 3, thereby allowing the rotor blade to gradually enter into the inner space of the frame 2.

Figure 4:
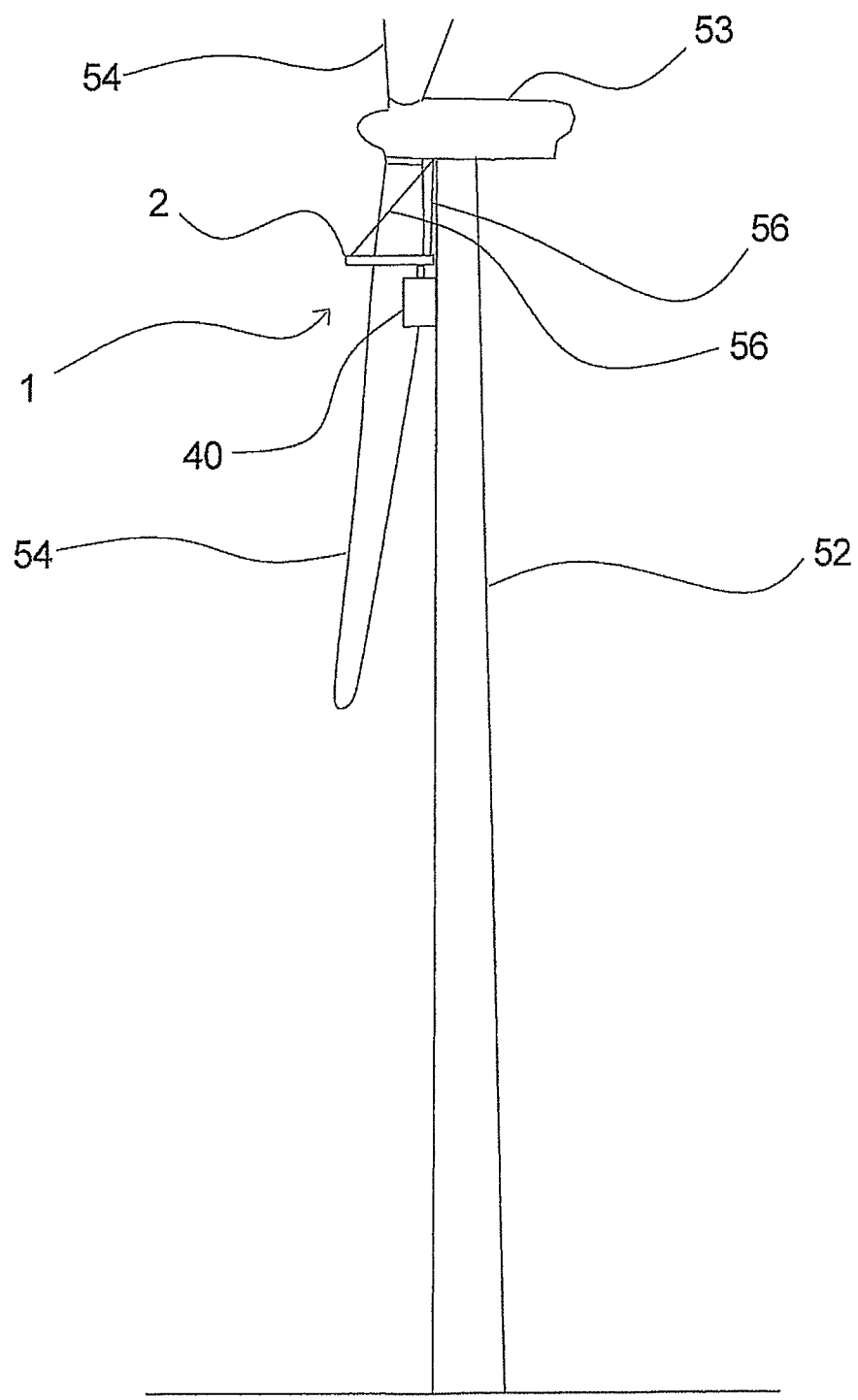

When the device 1 has reached a level, e.g. as shown in FIG. 4, where the frame 2 may be closed around the rotor blade, possibly after the device 1 has been displaced away from the tower 52 by the tower support arrangement 16, the front guide and support arrangement 8 is actuated to move to the closed position, thereby establishing a closed or essentially endless frame structure. It will be understood that the rear guide and support arrangement 10 may be moved towards the rear edge of the rotor blade, which is facing the tower, in order to make contact with the rotor blade and support the device, preferably at the earliest possible moment. The front guide and support arrangement 8 will be placed in such a manner that it will engage the front edge of the rotor blade 54, possibly after the tower support arrangement 16 has been retracted again. It will be understood that the rear guide and support arrangement 10 may be moved correspondingly in the longitudinal direction of the frame 2, e.g. by moving along the upper frame structure 6.

Figure 5:
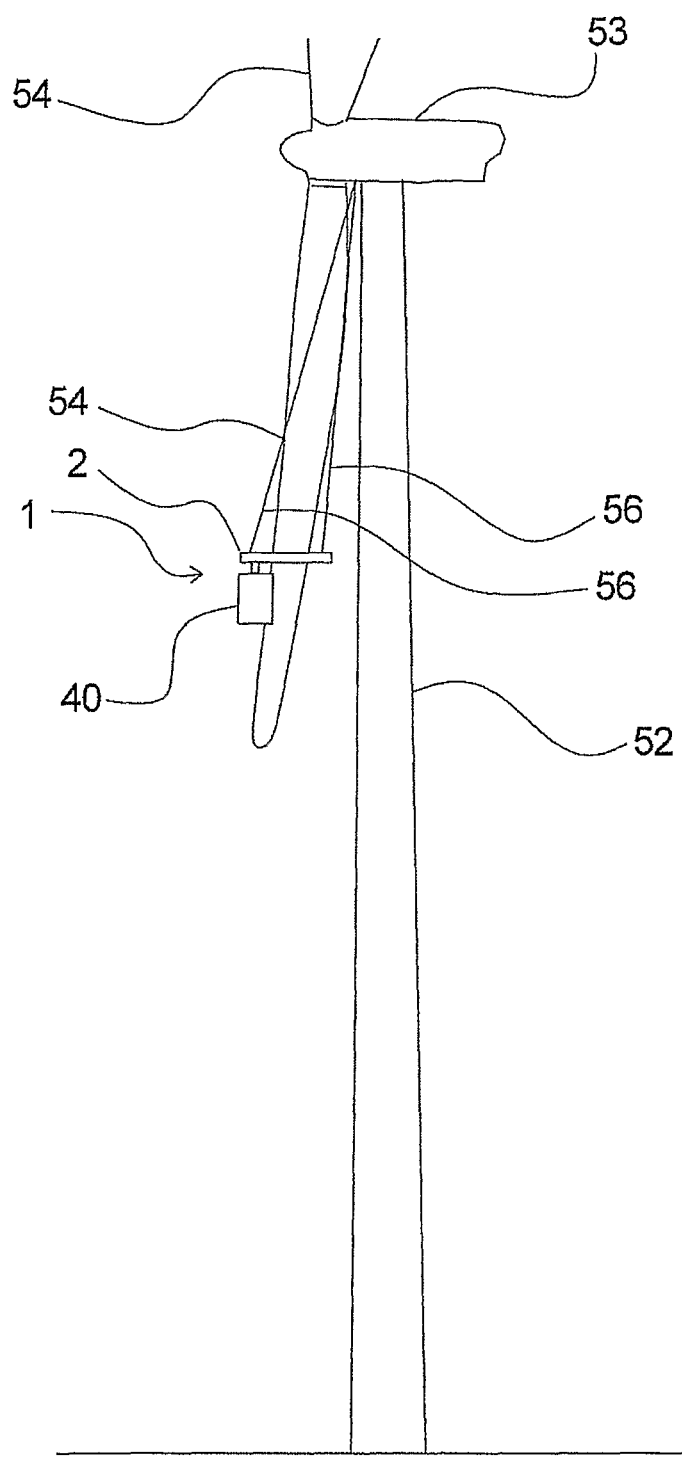

When the frame 2 has been closed and the support arrangements have been brought into contact with the rotor blade 52, the device 1 may now be lowered and/or lifted along the rotor blade 54 as shown in FIG. 5 by means of the hoisting means 20 and 22 and the lines, cables or wires 56, and the gondola 40 may be moved along the track 5 to essentially any position at the rotor blade. During these operations the device will be supported and guided only by the rotor blade.

When the necessary work has been performed on the rotor blade 4, the device 1 will be brought to the position as shown in FIG. 4 before the tower support is established again, the frame 2 is opened again, etc. and the device is being lowered downwards.

The front guide and support arrangement 8 and the rear guide and support arrangement 10 serve to position the device in relation to the rotor blade and in particular they serve to support against the rotor blade at regions, where the rotor blade has a suitable sturdiness, strength and robustness, e.g. at regions at or near the front edge of the rotor blade and at or near the rear edge of the rotor blade.

From this simplified explanation of the use of the device 1 it will be understood that the rear guide and support arrangement 10 will have to move in the longitudinal direction of the device in order to maintain contact to the specific region at the rear edge of the rotor blade. However, the front guide and support arrangement may also be configured for being movable in the longitudinal direction of the device.

The device 1 according to this embodiment will be further explained with reference to FIGS. 6, 7 and 8, which correspond to FIG. 1, but wherein the device is seen from above, from the end and from the side, respectively.

Figure 6:
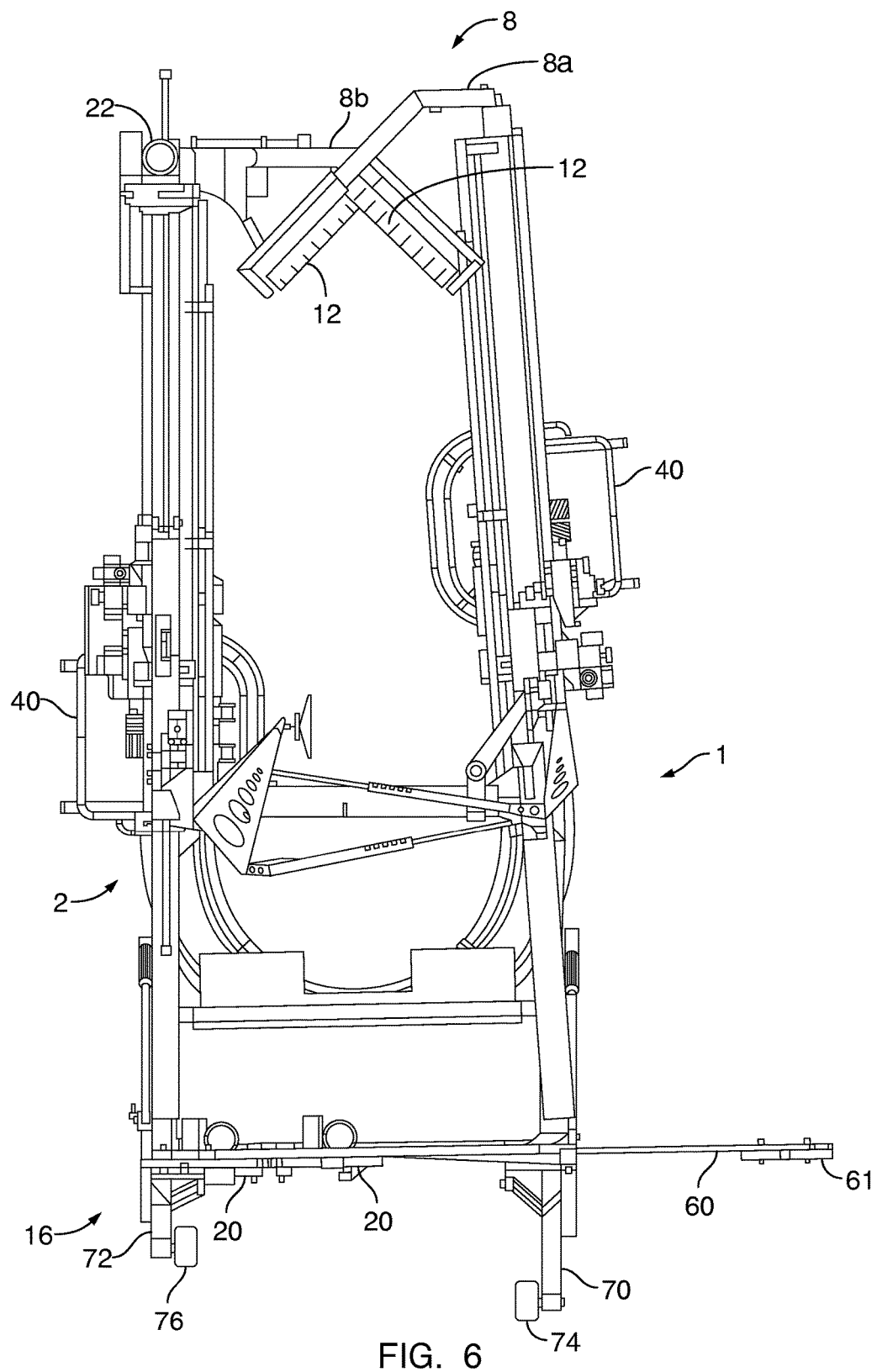
FIG. 6 shows the device seen from above.

As shown in FIG. 6, wherein the device 1 is seen from above, the frame 2 according to this embodiment is substantially U-shaped, with the front guide and support arrangement 8 placed at the open end. This front guide and support arrangement 8 comprises two front support arms 8a and 8b, each one carrying the front contact means 12. These front support arms 8a and 8b are connected to each their side of the frame and are pivotable, e.g. with the front support arm 8a being able to turn approximately 90° upwards, while the front support arm 8b is able to turn approximately 90° downwards, or vice versa, whereby the frame is opened. The front contact means 12 may as shown be in the form of relatively wide belts or the like that each is carried by two rollers or the like.

As also shown in FIG. 6, a front hoisting means 22 is placed at the outer end of the frame 2 and two rear hoisting means 20 are placed at the end of the frame 2 facing the tower. These hoisting means act on wires, cables or the like, which are connected to e.g. the tower, the nacelle or the hub, and the hoisting means comprise pulleys or the like for guiding the wires, cables or the like above the power means, e.g. the motors of the hoisting means 20 and 22. For two of the hoisting means shown in FIG. 6 the pulleys are placed essentially above the respective power means, but for one of the rear hoisting means 20 a line guiding arm 60 with respective pulleys 61 is arranged as shown, whereby the respective line or cable effectively supports the device at a point to the side of the device. Thus, it will be seen that the three wires, cables or lines operated by the hoisting means support the device in a triangular arrangement, whereby it is also assured that the device is hanging in a well-balanced manner, e.g. due to the fact that the centre of gravity is lying well within the triangle defined by the three support points.

As also shown in FIG. 6, the tower support arrangement 16 comprises two tower support arms 70 and 72, each carrying one or more tower support wheels 74 and 76. The tower support arms 70 and 72 are individually adjustable, whereby e.g. the distance from the frame 2 of the device 1 and the tower support wheels 74 and 76 can be adjusted, whereby the device can be pushed away from the tower. Furthermore, since the tower support arms 70 and 72 are individually adjustable, the angle of the device 1 in relation to the tower can be controlled, which may serve e.g. to position the device in relation to the rotor blade, for example prior to the transfer of the device to the rotor blade.

Figure 7:
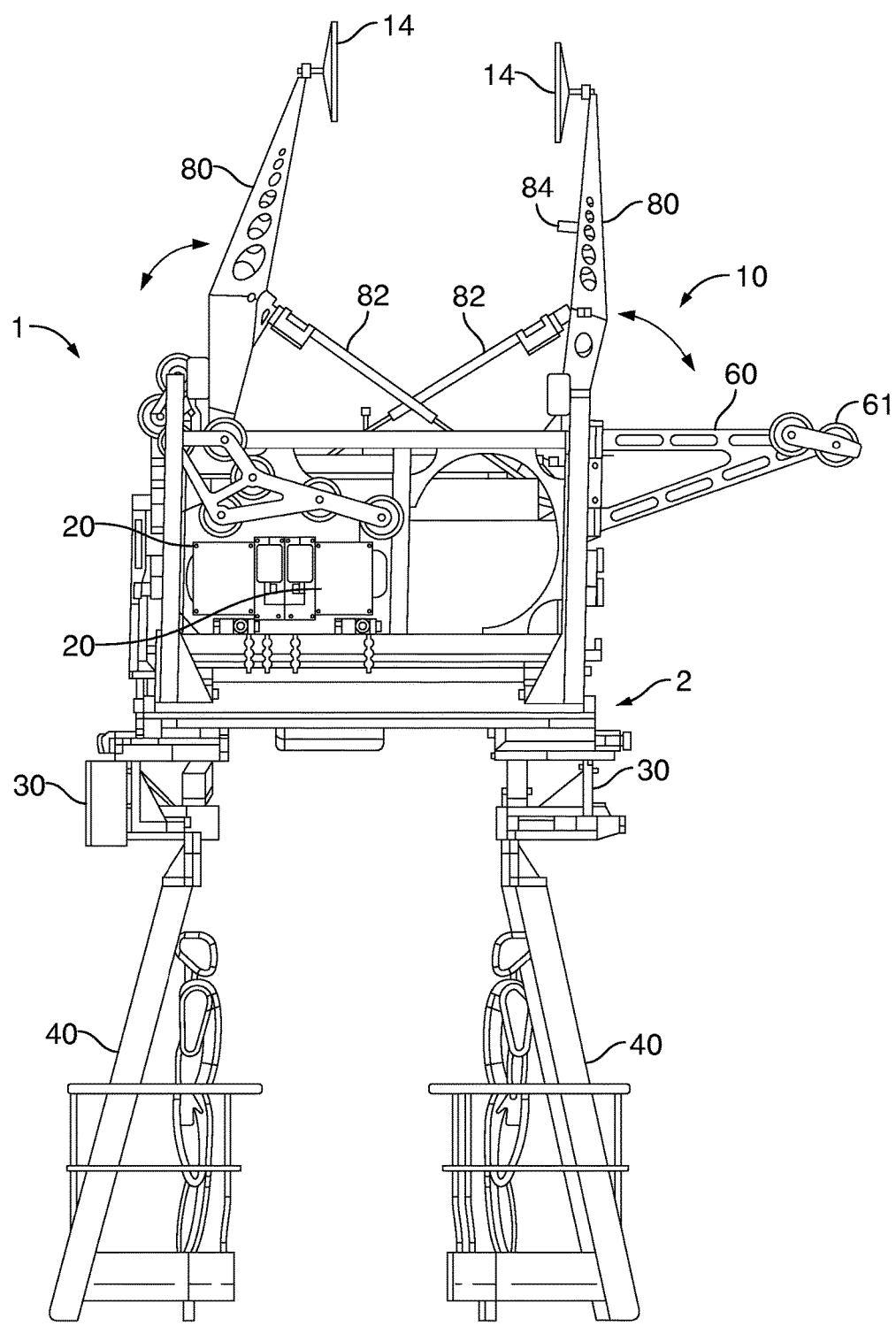
FIG. 7 shows the device seen from an end.

FIG. 7 shows the device 1 from the end, i.e. from the end facing the tower, where the device is shown with two gondolas 40, each one carried by a trolley 30. The trolleys 30 can move along the track 5, which may extend along the length of the lower frame structure, and as shown, the two gondolas may be situated at each side of the device, but they may also operate at one and the same side. They may be independently operated, e.g. by the respective persons situated in the gondolas, but the may also be operated in a master-slave-configuration.

The line guiding arm 60 with respective pulleys 61 that was described in connection with FIG. 6 is also shown in FIG. 7. It will be understood that the lines or cables are led via a plurality of pulleys to the power means of the hoisting means 20, from where the lines or cables are led down to the ground. Since the hoisting means climbs up and down the lines or cables, the lines or cables extend down to ground level. Similar applies for the front hoisting means 22, and the cable or line from this may preferably be led along the frame to the rear end of the device, where the cable or line is led down to ground level. Thus, all of these cables or lines may be hanging from the device at a place, where they will not get in the way of the e.g. gondolas 30 moving around under the frame of the device. In this connection it is noted that each hoisting means 20 and 22 may operate two cables or lines, one being a security line, cable or wire. Furthermore, it is noted that each hoisting means 20 and 22 may be equipped with a security device in the form of an emergency brake, e.g. a security device performing a braking in case a predetermined speed limit has been exceeded.

FIG. 7 also shows the rear guide and support arrangement 10 having the rear contact means 14, which are carried by rear support arms 80 that are pivotably, e.g. actuated by actuators 82. At the pivot locations sensors, e.g. weighing cells (not shown) are placed for measuring the force transferred to the rotor blade, e.g. corresponding to the load with which the rotor blade is influenced by the contact means 14. The measured signals are used for controlling the device, e.g. the angle of the rear support arms, in order to e.g. maintain the load within predetermined limits and in particular to achieve that the device is supported by both rear contact means 14.

Furthermore, it is shown in FIG. 7 that the rear guide and support arrangement 10 may be equipped with sensor means for detecting the position in relation to the rear edge of the rotor blade, which sensor means can provide input signals for a control system in order to adjust the position of the rear guide and support arrangement 10 in the longitudinal direction of the device 1, e.g. move the rear guide and support arrangement 10 backwards or forwards along the upper frame structure 6. Such sensor means may as shown comprise a sensor or a light source 84 placed on a rear support arm 80, which sensor or a light source 84 in combination with a corresponding unit placed on the other side of the rear guide and support arrangement 10 can provide information as regards the position of the rear edge of the rotor blade. For example, a light source, e.g. a laser light source, may cooperate with e.g. three photo-sensors placed horizontally. In case none of the sensors detects the light or all of the sensors detect light, the rear guide and support arrangement 10 is not in a position where the rear contact means 14 are in a position corresponding to the desired regions of the rotor blade. If one or two sensors detect light, however, and the other(s) not, the rear guide and support arrangement 10 is in a desired position. Depending on the circumstances and the results, the rear guide and support arrangement 10 can be appropriately adjusted. It will be understood that two (or more) such arrangements may be placed at the rear guide and support arrangement 10, e.g. with sensors at each side of the rear guide and support arrangement 10 and with corresponding light sources at each of the rear support arms 80.

It will be understood that similarly a sensor arrangement, e.g. an optical sensor arrangement can be located at the end of the frame 2, where the front guide and support arrangement is placed. Hereby, it is made possible to detect when a rotor blade enters the frame, i.e. the rear edge of the rotor blade and subsequently it can be detected when the rotor blade has entered in full, i.e. when the front edge of the rotor blade is detected, whereafter the front support arms 8a and 8b can be closed.

Figure 8:
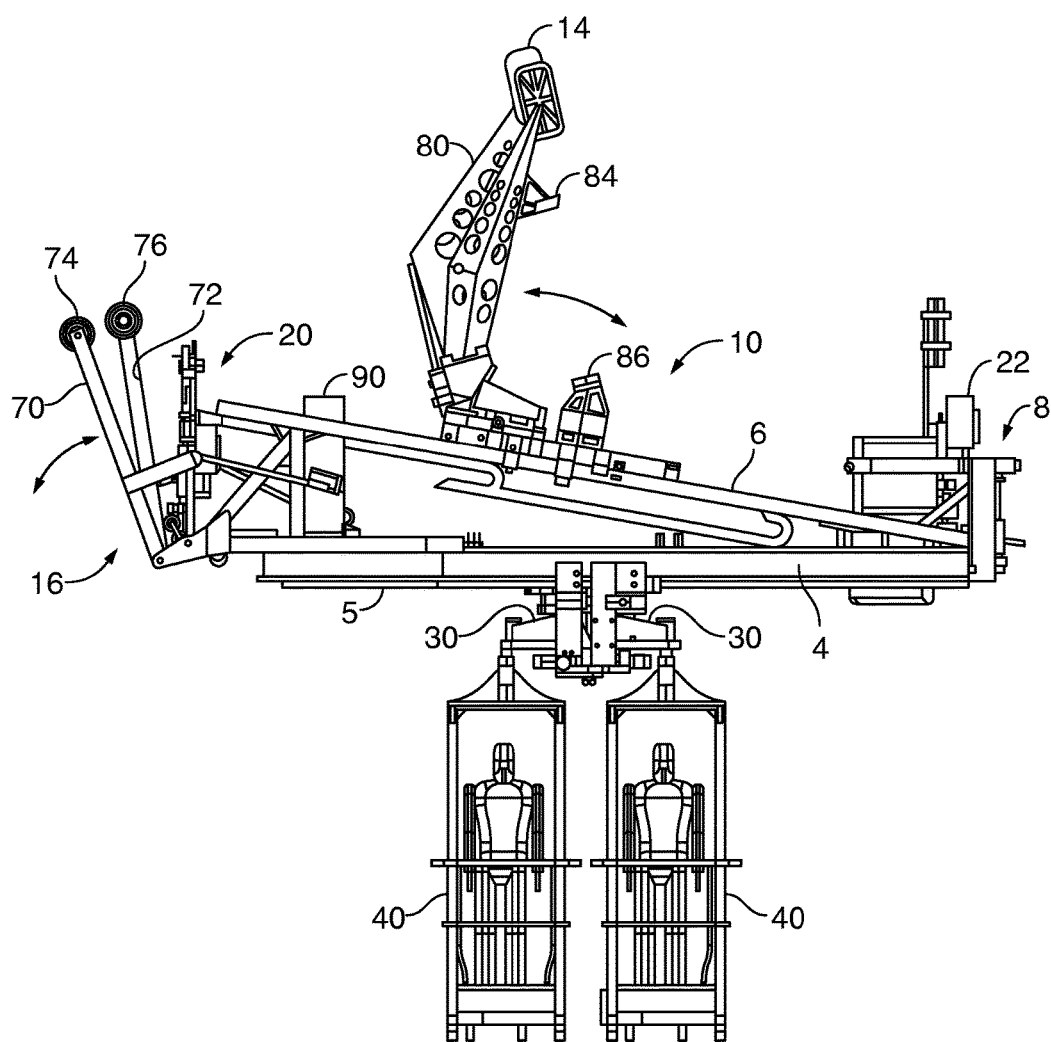
FIG. 8 shows the device seen from a side.

In FIG. 8 the device shown in FIG. 1 is seen from the side. Thus, the device comprising the lower frame structure 4 with the track 5 and the upper frame structure 6 is shown. Two gondolas 40 are carried by trolleys 30, which can move along the track 5 as described above. The upper frame structure 6 carries the rear guide and support arrangement 10, which can be moved back and forth as indicated. In addition to the sensor means 84 described above in connection with FIG. 7, it is here shown that the corresponding counterpart is located on the opposite side of the rear guide and support arrangement 10 in the form of a sensor or a light source 86. It will be understood that two such sensor arrangements may preferably be used, one for each rear support arm 80, whereby a detection is performed from each side.

It will be understood that the front contact means 12 as well as the rear contact means 14 will be connected to their respective support arms in a manner allowing a movement, e.g. in order to adapt to the actual angle of the surface of the rotor blade.

As it will be understood, the front contact means 12 and the rear contact means 14 will serve the purpose of supporting the device against the surface of the rotor blade, also while the device is moving up and down the rotor blade. Thus, they must be designed with a surface having a suitable friction characteristic, e.g. a small friction, whereby the device may expediently be hoisted up and down a rotor blade without subjecting the surface of the rotor blade to any harm, stress or undue load. Furthermore, in particular as regards the rear contact means 14, they will be required to move in the longitudinal direction of the rotor blade as well as in the transverse direction. According to a preferable embodiment of the invention the rear contact means 14 may be in the form of brushes, e.g. industrial bristles or brushes, which may transfer load to the rotor blade at a sufficiently large area, thereby reducing the load pr. area, and which has the advantage that they may be moved across the surface in any direction, i.e. omnidirectionally.

As regards the front contact means 12 belts, drums, rollers or the like may preferably be used, which have the advantage in connection with the relatively broad and rounded front edge that they may move across the surface even though it is not a strict linear movement and that they can distribute the load over a relatively large area. Further, it is noted that these belts, drums, rollers or the like may be provided with a row of sensors, e.g. contact sensors, pressure sensors in order to detect whether or not contact has been made and/or maintained with the rotor blade.

The function of the device 1 will now be explained in further detail. As explained above, when the device is lifted up along the wind turbine tower, preferably with the tower support arrangement 16 supporting the device 1 against the tower, the front guide and support arrangement 8 is being opened, e.g. by turning the front support arms 8a and 8b, in order to receive the rotor blade. This may for example take place, when the device is being hoisted upwards along the tower. Further, the rear guide and support arrangement 10 has been moved towards the open end of the frame, and the rear contact means 14 has been moved to an outer position, whereby the rear edge of the rotor blade is free to enter the inner space of the frame. When this happens, it will be detected by means of sensors, for example the above-mentioned optical sensors placed at the open end of the frame 2 and/or at the rear guide and support arrangement 10, and the rear contact means 14 will be moved towards the surface of the rotor blade, until they contact the surface of the rotor blade at a predetermined region near the edge. As the rotor blade moves into the open frame, as the device is hoisted further upwards, the rear guide and support arrangement 10 is moved towards the tower, controlled by the control system on the basis of sensor inputs, in order to have the rear contact means 14 bearing against the rotor blade in the predetermined region near the rear edge.

The device may be moved towards the rotor blade by the tower support arrangement 16, e.g. the tower support arms 70 and 72, for example, when the device is at a suitable height, where the distance to the rotor blade is convenient, e.g. in view of the distance to the front edge of the rotor blade and/or the rear edge of the rotor blade, for example at or near the location usually referred to as "chord max", and/or where the distance to the front edge of the rotor blade is at a minimum or at least sufficiently small. The movement upwards is stopped and the tower support arms 70 and 72 are controlled to push the opened frame closer to the rotor blade, until the front guide and support arrangement 8 can be closed again. Hereafter, the tower support arms 70 and 72 may be retracted, whereby the device 1 now will support against the rotor blade by means of the front guide and support arrangement 8.

In this operative mode, the rear guide and support arrangement 10 will be moved back and forth in the frame in correspondence with the varying width of the rotor blade as explained above.

As also explained above, the tower support arrangement 16 may further be used for controlling the angular position of the device in relation to the tower, which for example may be used in windy conditions to "catch" the rotor blade, when the device is being hoisted up along the wind turbine tower.

It will be understood that a tower support arrangement 16 comprising more than two wheels may be used, for example in order to increase stability. Thus, this or these wheel arrangements may extend along a larger part of the perimeter of the wind turbine tower.

Figure 9A:
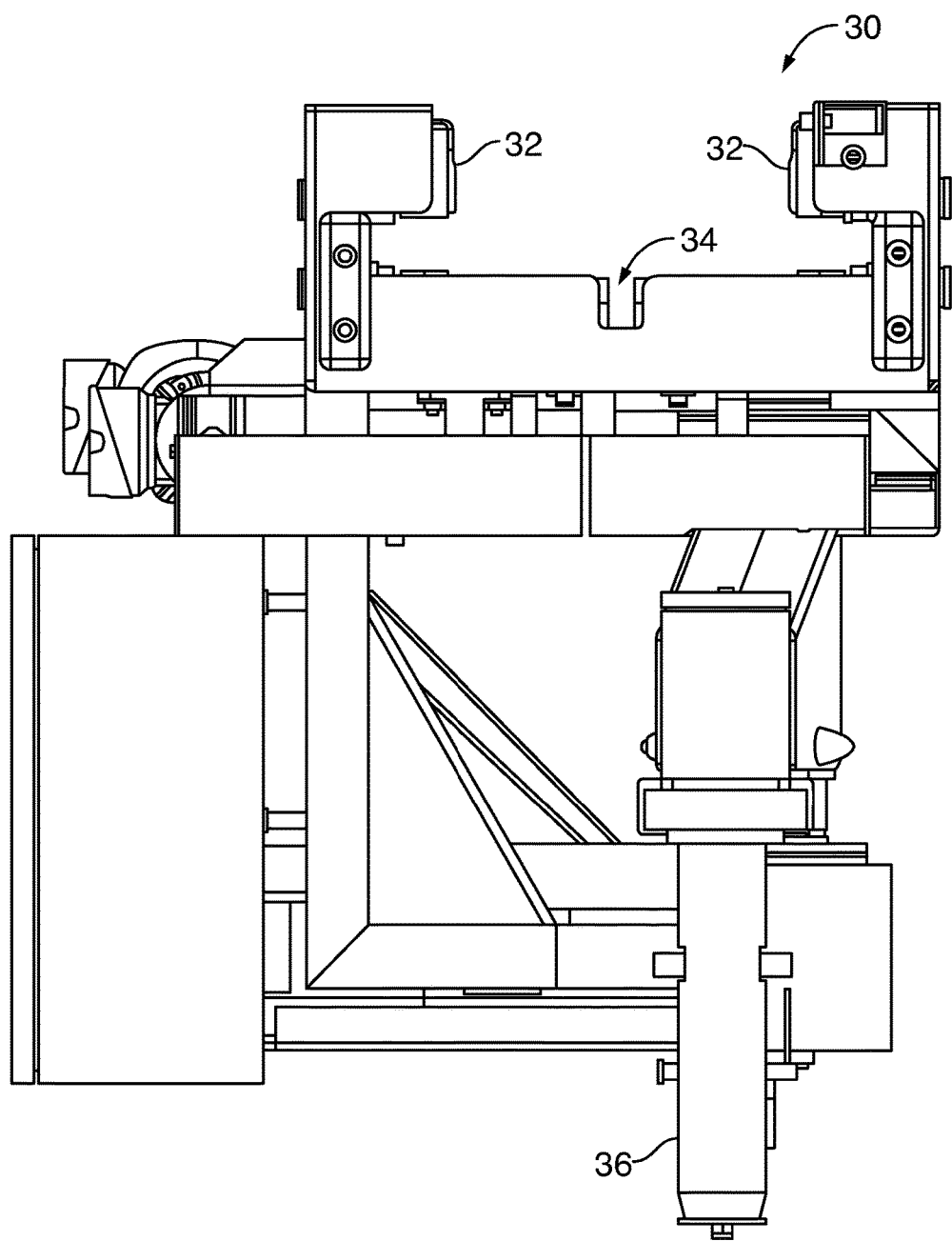
FIGS. 9a, 9b show an embodiment of a trolley according to a further aspect of the invention.
Figure 9B:
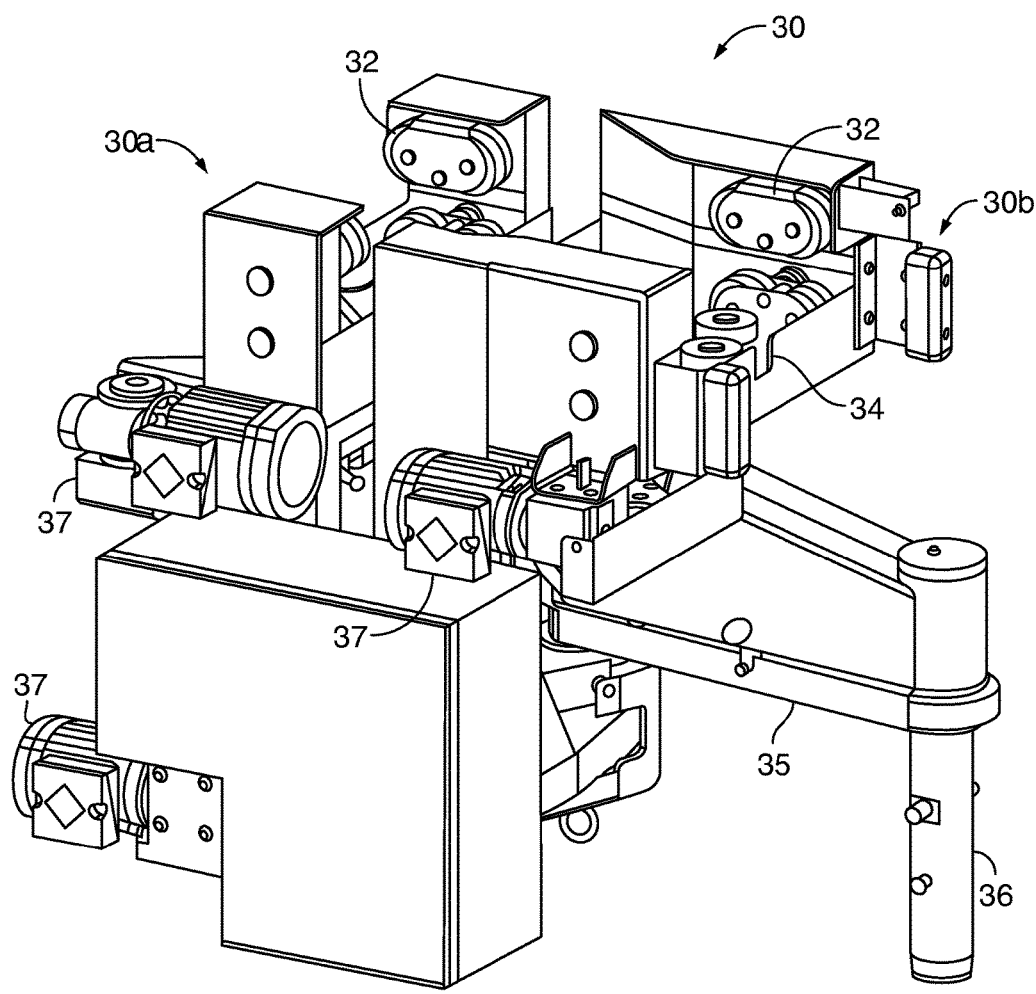

FIGS. 9a and 9b show in enlarged views an embodiment of a trolley 30, seen from the end and in a perspective view, respectively. At the upper part, means 32 are provided for gripping the horizontal flanges of the track 5 and/or the lower frame structure 4. Further, it is shown that a slit 34 is provided for accommodating a rib underneath the track 5. Power means 37 such as an electric motor may transfer drive power to the rib and/or to the flanges of the track 5. Preferably, the trolley 30 may comprise two parts 30a and 30b (FIG. 9b), which are connected in such a manner that they may turn in relation to each other, whereby the trolley 30 can cope with the relatively small turn radius of the track and whereby the trolley 30 can carry the weight of the e.g. gondola 40 with a person and tool, spare parts, etc.

The trolley 30 comprises a connection tap 36 for establishing connection with e.g. a gondola 40. The connection tap 36 can be controlled around its own axis and can be controlled to turn in relation to the trolley 30, since it is connected to the trolley by means of a horizontal arm 35 (FIG. 9b), which can turn in relation to the trolley.

Figure 10:
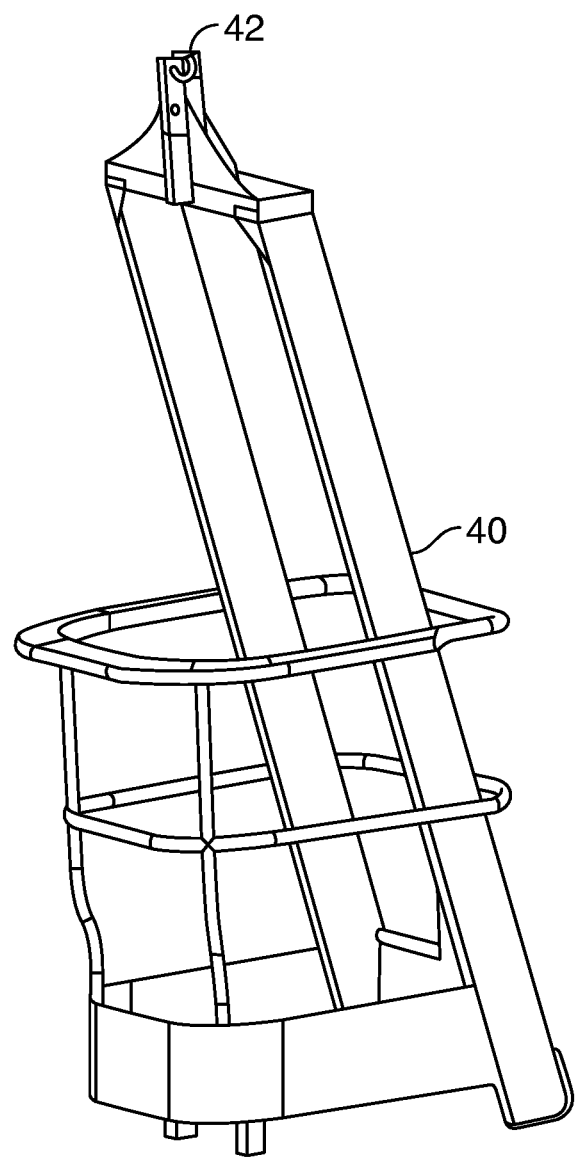
FIG. 10 shows an embodiment of a work platform or gondola according to a further embodiment.

FIG. 10 shows a corresponding gondola 40 or work platform for use in connection with the device 1, e.g. for being connected to a trolley 30 located on the track 5. In order to be connected to the connection tap 36 of the trolley 30, the gondola is provided with a corresponding connection part 42. The gondola may be formed as an open cage of aluminium tubes, possibly with fenders for preventing that the gondola damages the windmill blade being inspected, serviced or repaired, etc.

The cage can accommodate one, two or even more individuals. The gondola comprises a control panel or the like (not shown), which allows the individual (s) using the gondola to move the gondola around the wind turbine blade and lift and/or lower the device together with the gondola relative to the blade. The up and down movements of the gondola can for example be provided by use of a joystick. Further facilities such as rooms for repair equipment etc. can also be provided. Due to the characteristics of the trolley 30, the gondola 40 is suspended in an eccentric manner, which as explained above provides the possibility that the position of the gondola may be adjusted when the suspension is rotated. The rotation can be controlled for example by a control panel or a joystick. Such an embodiment is of particular importance, when a frame is used, where the track does not extend along a full perimeter of the rotor blade. It will be apparent to a skilled person that the suspension can be designed in various other manners than the one shown in FIG. 9. In essence, a horizontal movement of the gondola 40 is achieved. Furthermore, it will be understood that an object in general, e.g. a robot, a tool, an apparatus, etc., being supported by the device 1 can be operated corresponding to, what has been explained above for the gondola 40.

In connection with FIGS. 1, 6, 7 and 8 the front contact means 12 and the rear contact means 14 have been described in a general manner, although it has been mentioned that the rear contact means 14 may preferably comprise brush means, e.g. industrial brushes, and that the front contact means 12 may preferably comprise belts, drums, rollers or the like. As mentioned, the contact means are adapted for transferring a load to the rotor blade in such a manner that the rotor blade is not damaged, that the contact means can be moved along the surface with only little friction and that preferably that can move not only linearly, but move in order to adapt to the requirement that the above-mentioned regions have to be tracked, i.e. move in an omnidirectional manner. In the following these contact means and other means for use as contact means will be described with reference to FIGS. 11-27.

Figure 11:
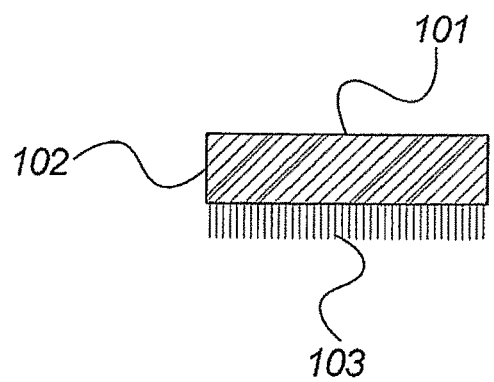

In FIG. 11 a brush contact means 101 is shown in a side view. As shown, the brush contact means 101 comprises a base part 102 carrying a plurality of bristles 103, as mentioned for example industrial bristles for e.g. conveying purposes. The brush contact means 101 has the advantage that the bristles adapt to the surface of the rotor blade, that the bristles contact the rotor blade at a large number of positions, that the friction is relatively low, that the bristles are not oriented and may move in any direction, i.e. omnidirectionally, and that the bristles in general are gentle to the surface, whereby load damage, scratches and abrasion can be avoided. The size of the base part 102 and/or the number of bristles 103 may be designed in view of the load that has to be transferred.

Figure 12:
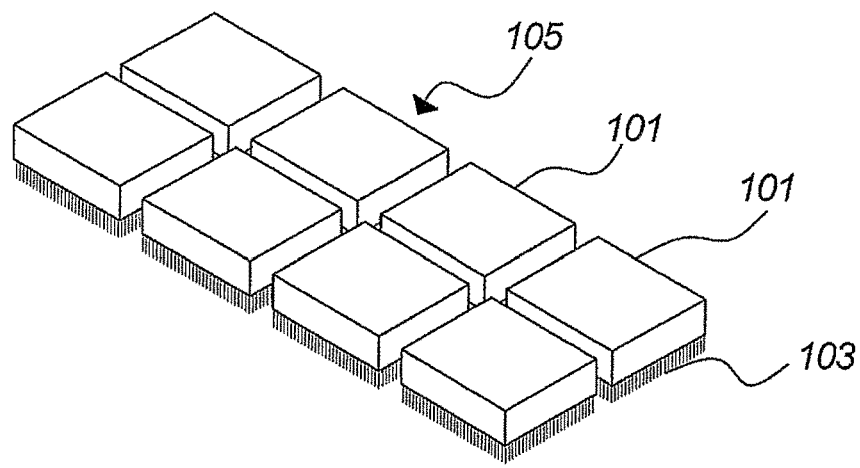

In FIG. 12 it is illustrated that a plurality of such brush contact means 101 may be combined to form a unified contact means 105. The individual brush contact means 101 may be connected to each other in a rigid manner but preferably they are connected to each other in at least a resilient and flexible manner.

Figure 13:
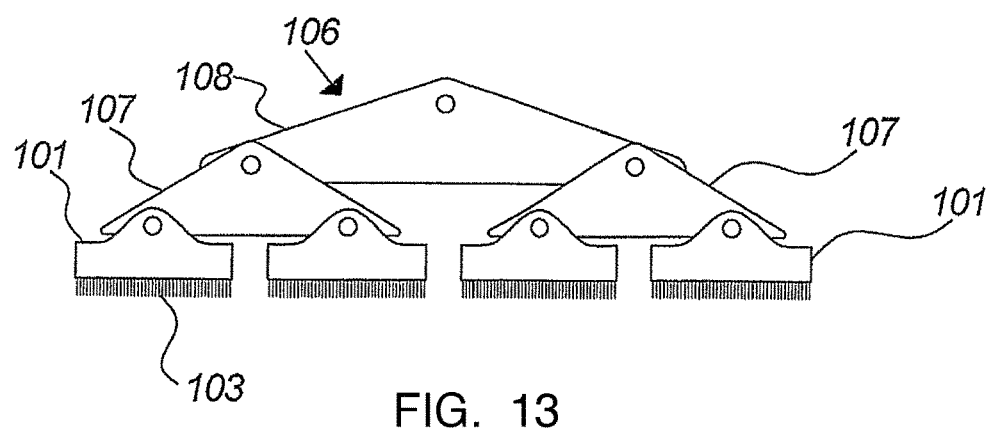

In FIG. 13 it is illustrated how a plurality of brush contact means 101 may be combined to form a contact means 106 that can adapt to the surface by having a number of carriers 107 and 108 connected pivotably to each other and to the brush contact means 101.

FIG. 14 illustrates a further contact means 110 in a side view. This contact means 110 comprises a base part 111 with an inlet 113 for e.g. compressed air and having an air chamber 112 having outlets (not shown) facing downwards, e.g. a plurality of holes, slits or the like, or air outlets in any suitable form for establishing an air cushion towards the surface of the rotor blade, whereby omnidirectional movement can be achieved.

Further, liquid contact to the surface of the rotor blade may also be used for establishing an omnidirectionally movable contact means.

As shown in FIG. 15, a plurality of such air cushion contact means may be combined to form a unified contact means 115 in a manner corresponding to, what has been explained above in connection with FIGS. 12 and 13.

Furthermore, FIGS. 16 and 17 show a further embodiment of a contact means 120, seen from the side and from the end, respectively, where a plurality of modular contact means 110 are combined in a flexible manner. Here, a number of carriers 121, 122 and 123 are connected pivotally to each other and to the brush contact means 110, e.g. in such a manner that pivotal movement is obtained in relation to a plurality of axes, including axes that are perpendicular to each other. Hereby, the contact means may adapt to the curvature of the surface in two directions.

As regards the front contact means 12 that in FIGS. 1, 6, 7 and 8 have been illustrated as belt means with the belt direction being essentially in correspondence with the axis of the rotor blade, other embodiments will be illustrated in the following with reference to FIGS. 18-25.

Figure 18:
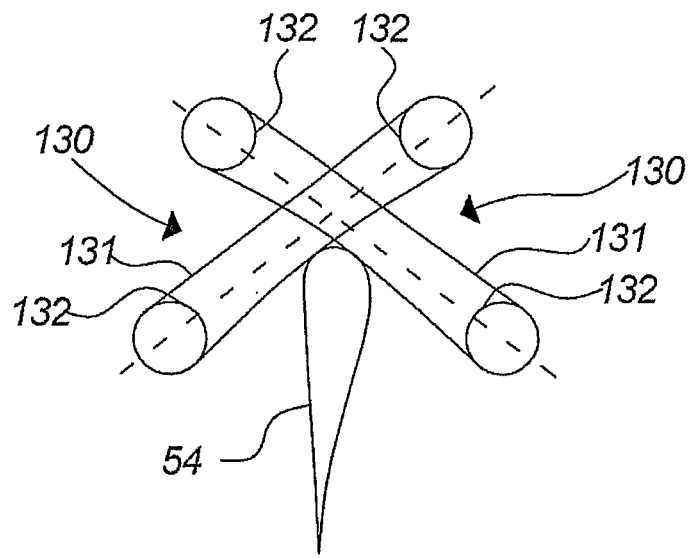
Figure 19:
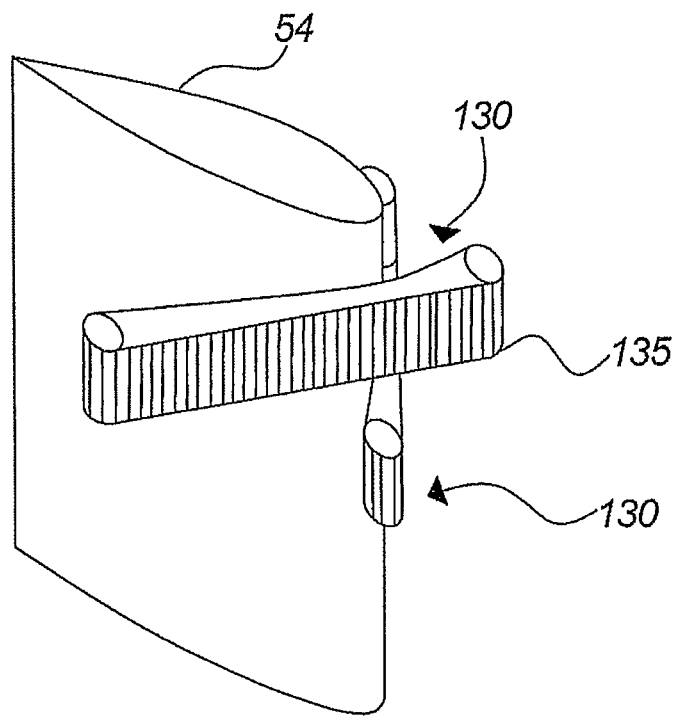

In FIG. 18 a rotor blade 54 is shown in a schematic manner is a sectional view together with two also schematically shown front contact means 130. These comprise each two drums or the like 132 placed with their axes essentially in parallel with the rotor blade or with only a small angular difference. On these drums or the like 132 a belt-type element 131 is placed, which may move around the drums or the like 132, e.g. effecting a movement in the transverse direction of the rotor blade 54. This arrangement is also illustrated in a schematic manner in FIG. 19 in a perspective view of part of the rotor blade and the front contact means 130. As shown here, the belt-type element 131 may comprise elements 135, which can cause a movement in the longitudinal direction of the rotor blade and which will be described in the following.

Figure 22:
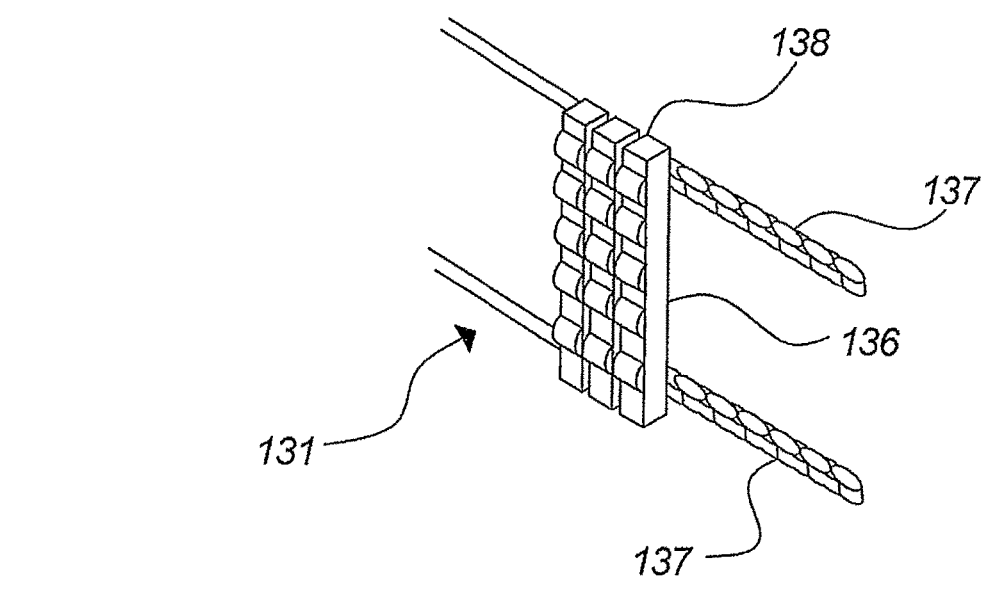
Figure 23:
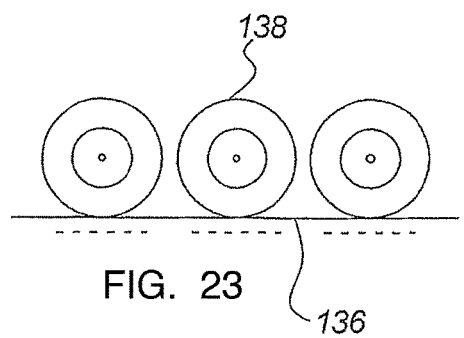
Figure 24:
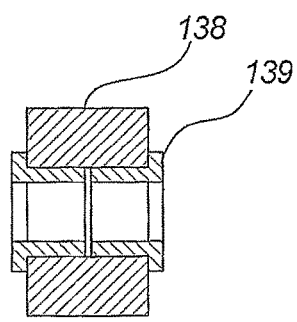
Figure 25:
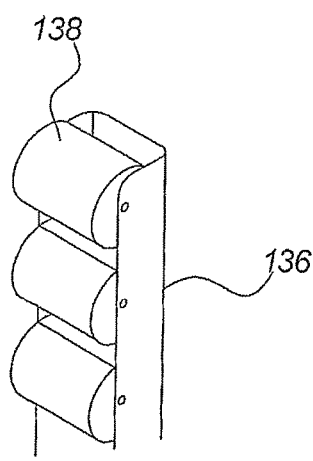

FIG. 22 illustrates such a belt-type element 131, where a pair of flexible elements 137, e.g. chains or the like, carries a plurality of roller elements 136, each one comprising a number of rollers 138 as also shown in FIGS. 23 and 25. FIG. 24 shows such a roller 138 comprising an outer roller carried by bearing means 139.

Figure 20:
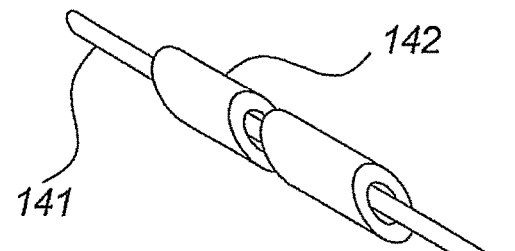
Figure 21:
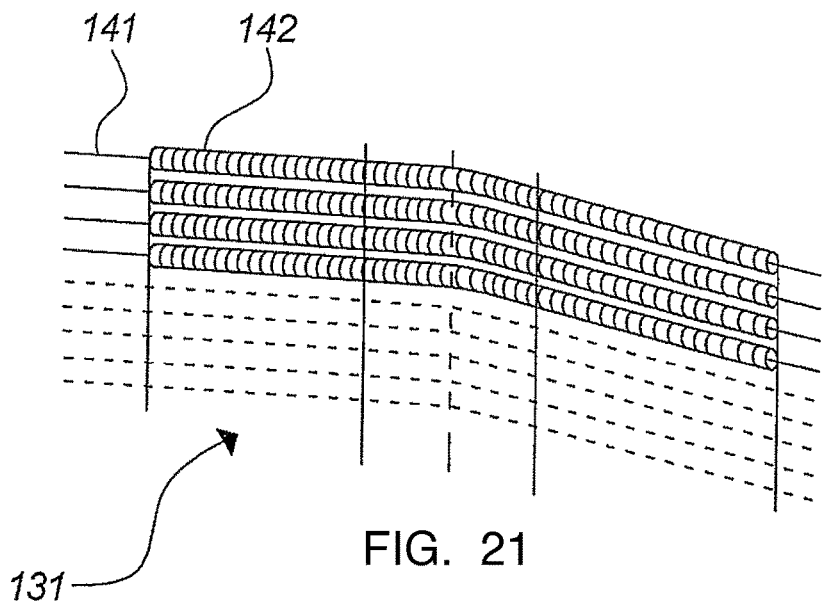

An alternative embodiment of such a belt-type element 131 is illustrated in FIG. 21, where it is shown that the belt-type element 131 may comprise a plurality of flexible elements 141, for example wires, chains, etc. that extend around the drums or the like 132 and each carries a plurality of rollers 142 as also shown in FIG. 20, where a small part of a flexible element 141 is shown with two rollers 142. Thus, it will be understood that such an arrangement will serve to take care of a movement in the longitudinal direction of the rotor blade due to the rollers 142 and will also serve to take care of a movement in the transverse direction of the rotor blade because the flexible elements 141 can be moved in this direction, carried by the drums or the like 132.

Figure 26:
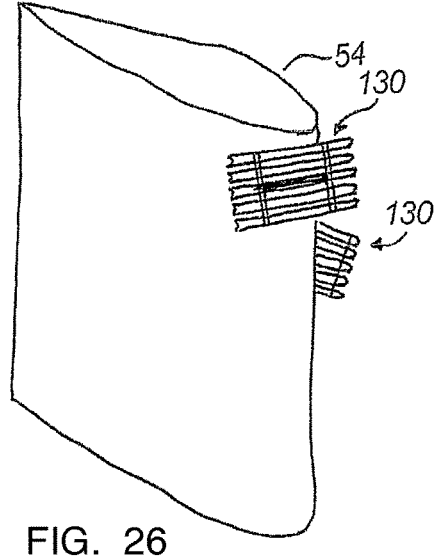
Figure 27:
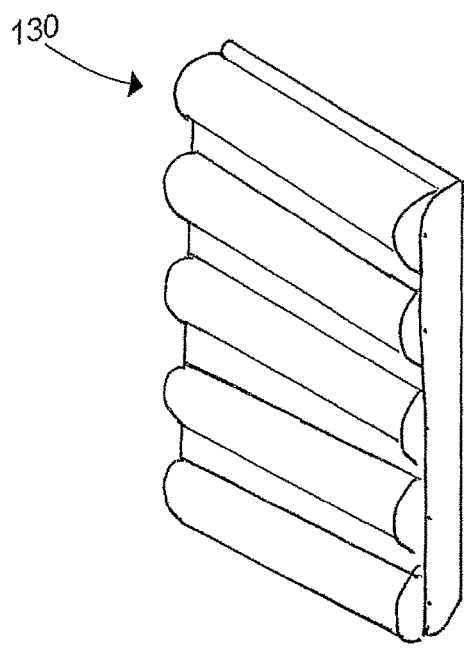

In FIG. 26 a rotor blade 54 and two contact means 130 are shown in a schematic manner in a sectional view. In this view the front contact means 130 comprises each five drums, rollers or the like placed with their axes essentially tangentially to the rotor blade. The drums, rollers or the like will be in contact with the rotor blade and serve to take care of a movement in the longitudinal direction of the rotor blade. FIG. 27 illustrates the front contact means 130 from FIG. 26 as a cassette. The cassette carrying the drums, rollers or the like can be be pivoted arbitrarily and will thereby serve to take care of a movement in the transverse direction of the rotor blade. Even though the cassette is shown with five drums, rollers or the like, the number of drums, rollers or the like can be both more and less. The length of the drums, rollers or the like and the distance between the drums can also be selected to be different.

It will be understood that other embodiments, variations, etc. are possible when designing such contact means and that combinations hereof are possible as well.

A device according to an embodiment of the invention and the use hereof will now be explained in further detail with reference to FIGS. 28 to 47, wherein the use of a device 1 is exemplified in connection with a land based wind turbine. It will be understood, though, that the device may be used in a similar fashion in connection with sea based wind turbines.

Figure 28:
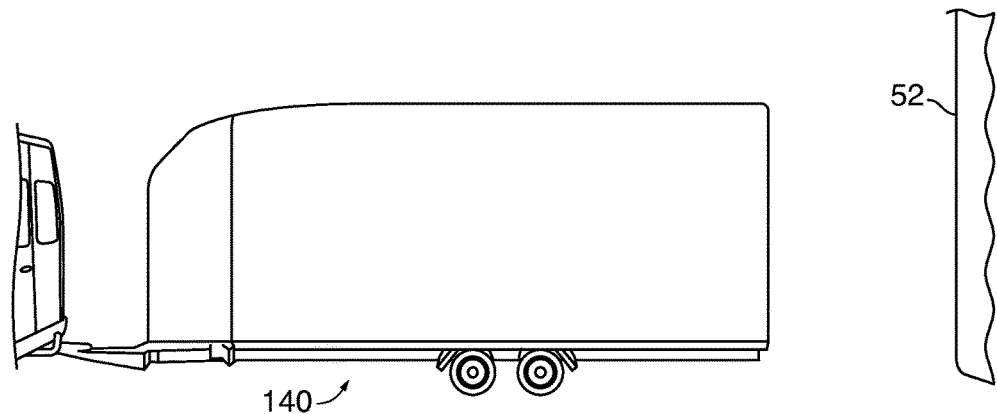
FIGS. 28-47 show a device according to an embodiment of the invention and the use hereof.
Figure 29:
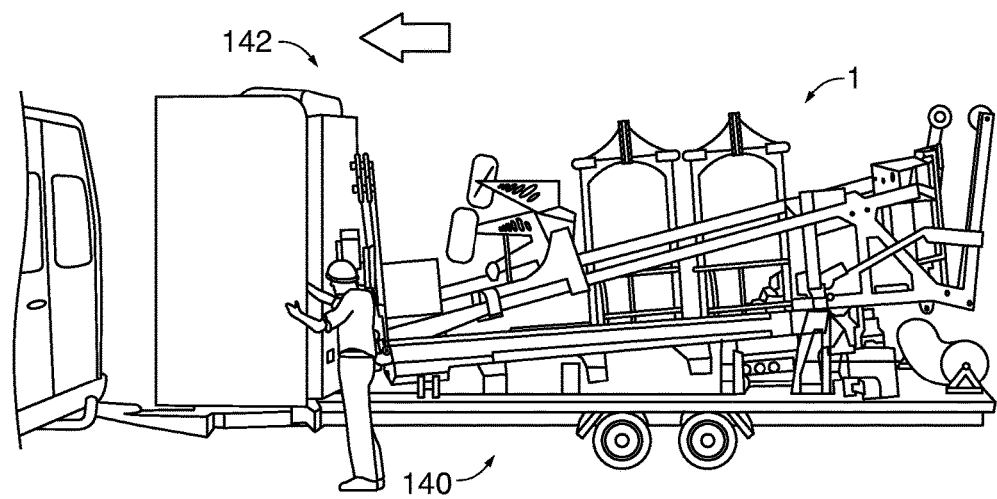
Figure 30:
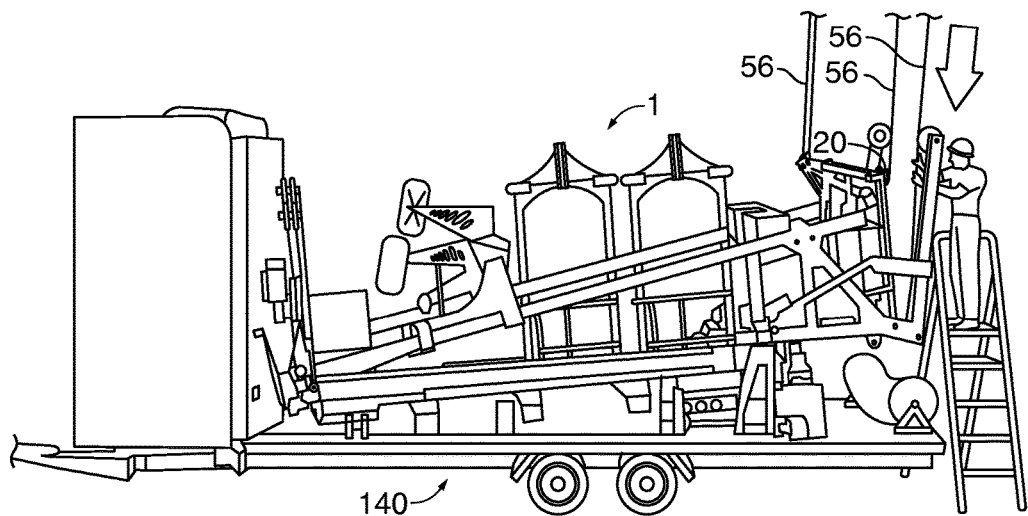

In FIG. 28 it is shown that the device is transported to the location of the wind turbine as indicated by the tower 52 by means of a trailer 140. It will be understood that a truck, a lorry or another type of vehicle may be used instead. As shown in FIG. 29, the trailer 140 is opened and the covering 142 is moved towards one end of the trailer 140, whereby the device 1 will be immediately available for the necessary preparations, as will be explained in the following.

Figure 31:
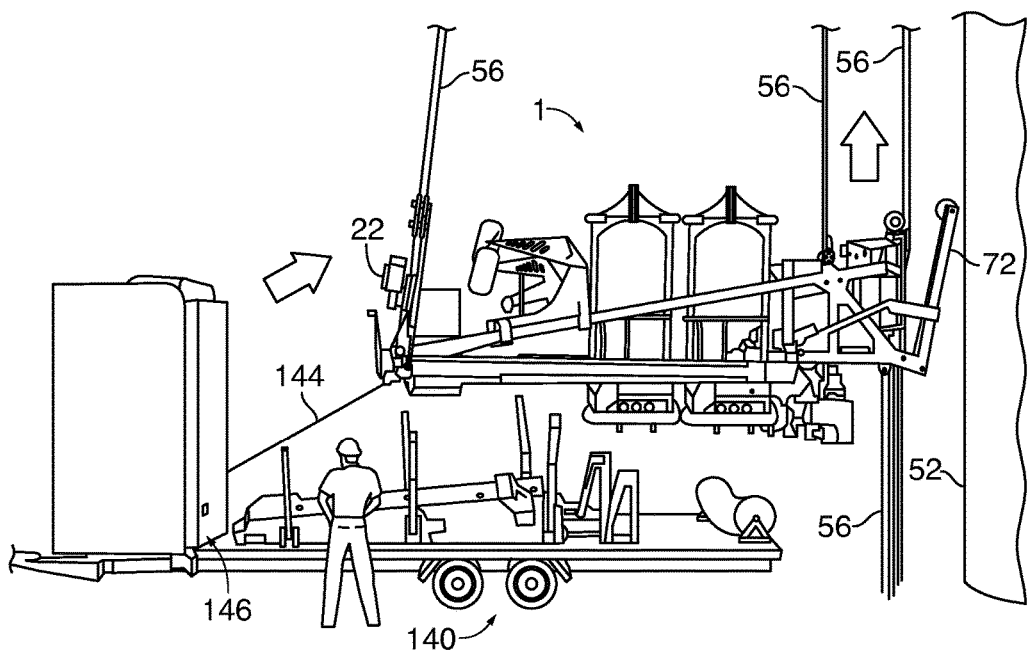

The necessary lines, cables, wires or the like 56, which have been connected to e.g. the top of the tower 52, is connected to the respective hoisting means 20 and 22, and as shown in FIG. 31, a line, cable or the like 144 is connected from a winch 146 or the like, which is placed on the trailer 140, to the device 1. This line 144 and the winch 146 serves to control the position of the device 1, while the hoisting means 20 and 22 are controlled to lift the device 1 slightly, whereby as indicated in FIG. 31, the device can be brought to a position near the tower 52, where it will be hanging from the lines, wires or the like 56. Here, the tower support arrangement may initiate its operation, e.g. by establishing a support against the tower by means of e.g. the tower support arms, of which the arm 72 is shown in FIG. 31. It is noted that the control of the device 1 and the associated elements, winches, hoisting means etc., may be performed using remote control devices and/or control devices located at the device and/or at the trailer or any other suitable place.

Figure 32:
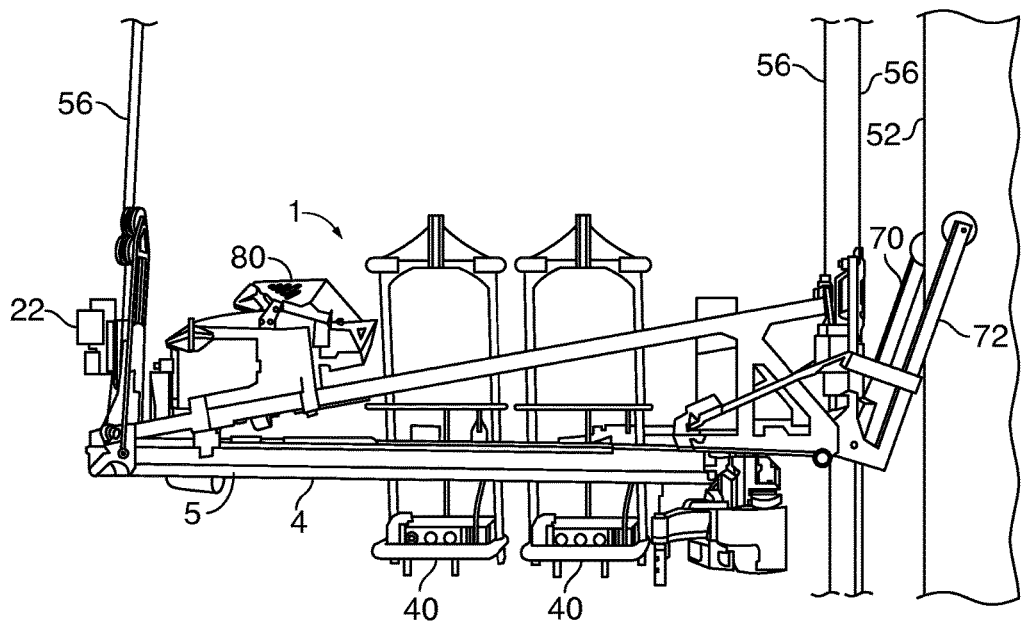
Figure 33:
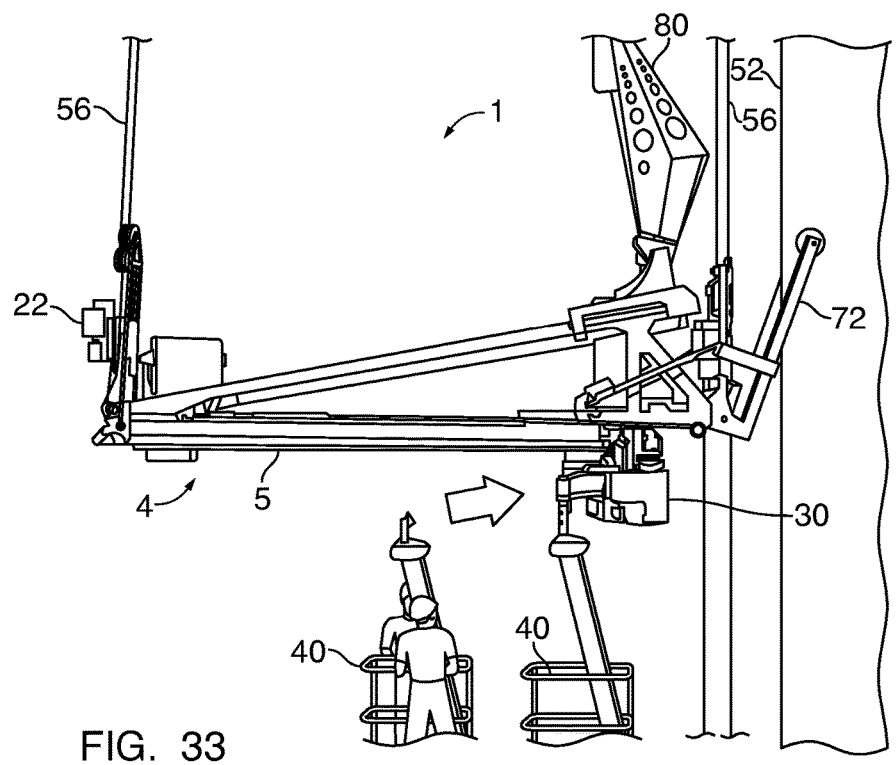

As shown in FIG. 32, the trailer may now be removed, whereby it will be possible to make the device ready for operation, e.g. by taking the work platforms 40 down from the storage place and by connecting the work platforms 40 to the device 1, e.g. to the trolleys 30, which are mounted on the track 5 of the lower subframe 4 as indicated in FIG. 33. As also shown in FIG. 33, the rear support arms 80 are moved on the device 1 to a position near the tower and erected to their operative positions. Further, it is noted that at a point in time during or after these preparations, the device may be controlled to perform an automatic levelling, e.g. based on gyro signals, and a calibration may be performed, whereby the distance near the ground may be taken as the initial level.

Figure 34:
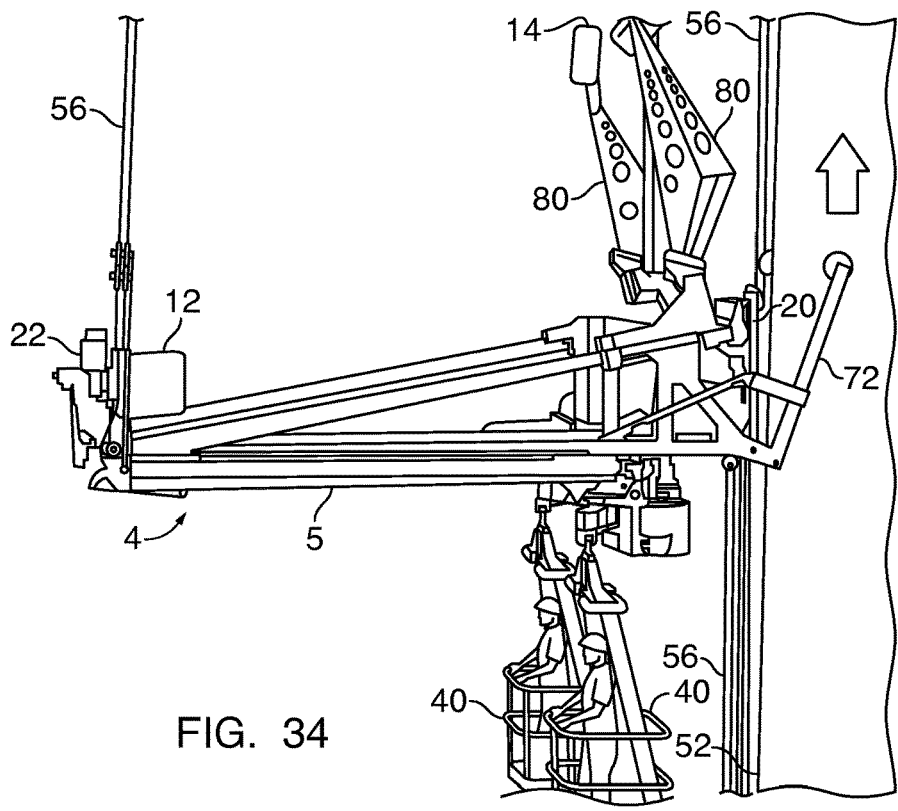

After the necessary preparations, the work person or persons may enter the platforms 40 as shown in FIG. 34, connect the security lines and the movement upwards may start, while the device 1 is supported against the tower 52. During the movement upwards, the device is controlled as mentioned above, e.g. with one hoisting means serving as a master and the other as slave units, whereby an e.g. horizontal position may be maintained. As also shown in FIG. 34, the cables, wires, lines or the like 56 are all led to a position near the tower 52, from where they are hanging downwards close together. It is noted that the hoisting means may be of the type, which are crawling up and down the lines, whereby the lines always will extend down to the ground. If drum type hoisting means are used, the lines may be accumulated on e.g. a drum instead.

Figure 35:
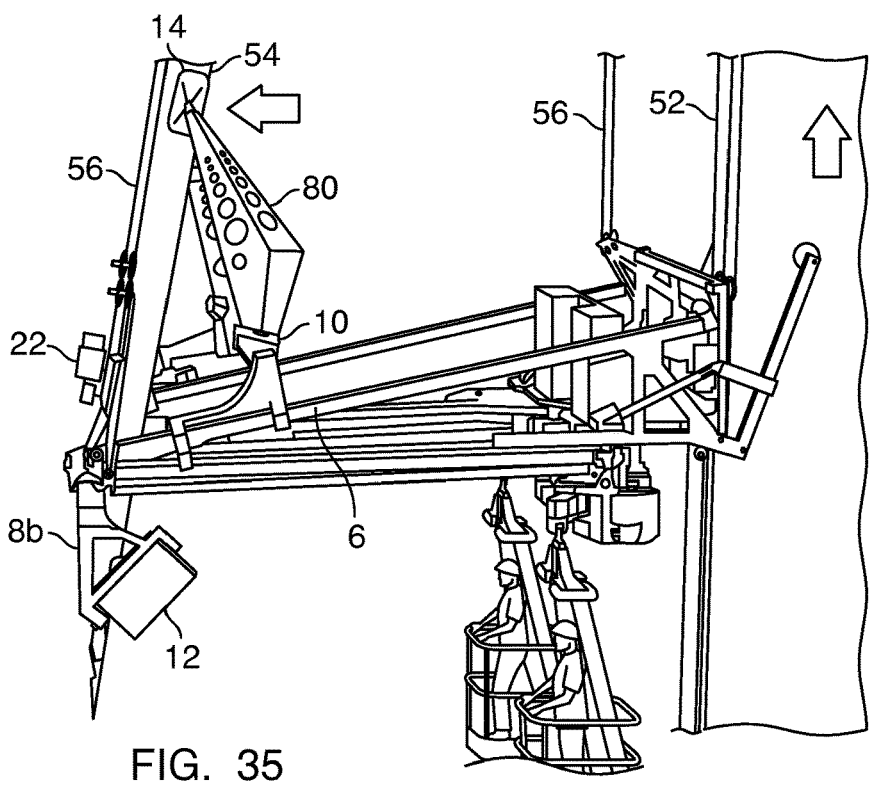

As previously explained and as shown in FIG. 35, when a height is reached, where the rotor blade 54 is within reach, the front guide and support arrangement 8 has been opened, e.g. with the front support arm 8b being tilted downwards and the other arm (not shown in FIG. 35) tilted upwards. Furthermore, the rear guide and support arrangement 10 has been moved forward, whereby the rear support arms 80 with the rear contact means 14 are ready to accommodate the rotor blade 54. By means of the above described sensor arrangements etc., the position of the rear edge of the rotor blade 54 in relation to the rear guide and support arrangement 10 is detected and the rear support arms 80 with the rear contact means 14 are controlled in dependence hereupon, e.g. in order for the rear contact means 14 to contact the desired regions of the rotor blade.

Figure 36:
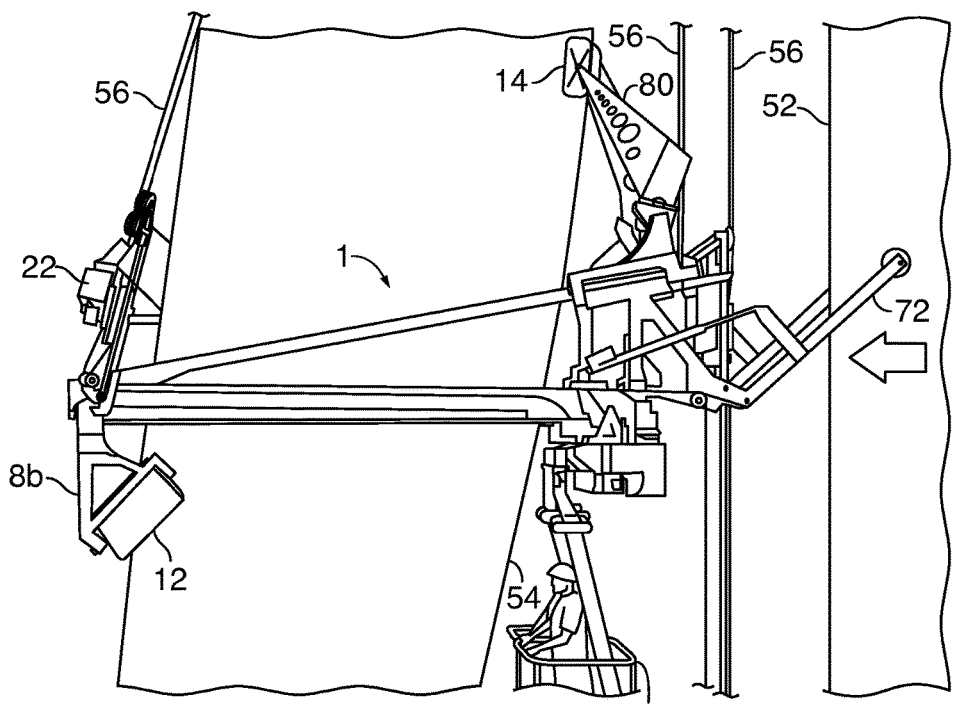
Figure 37:
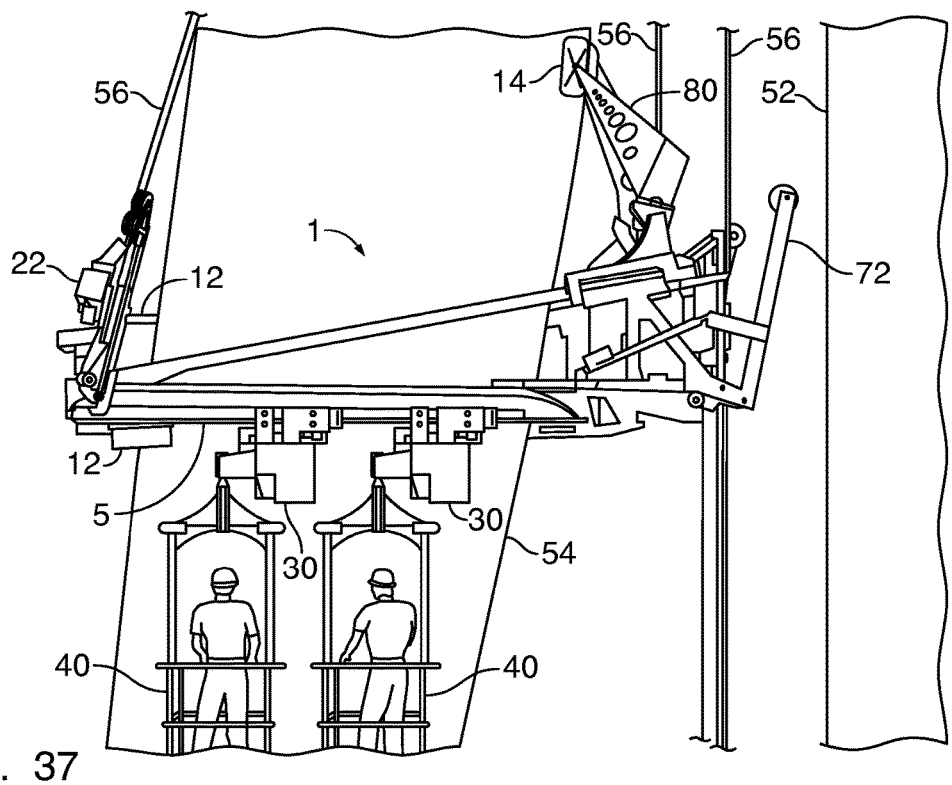
Figure 38:
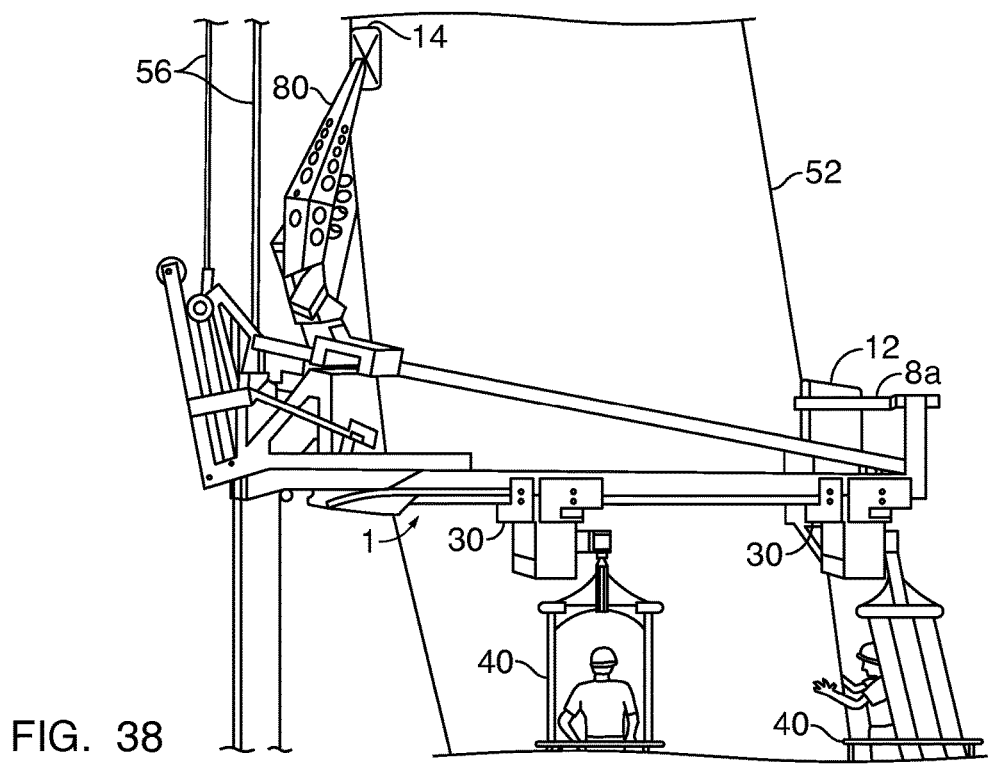
Figure 39:
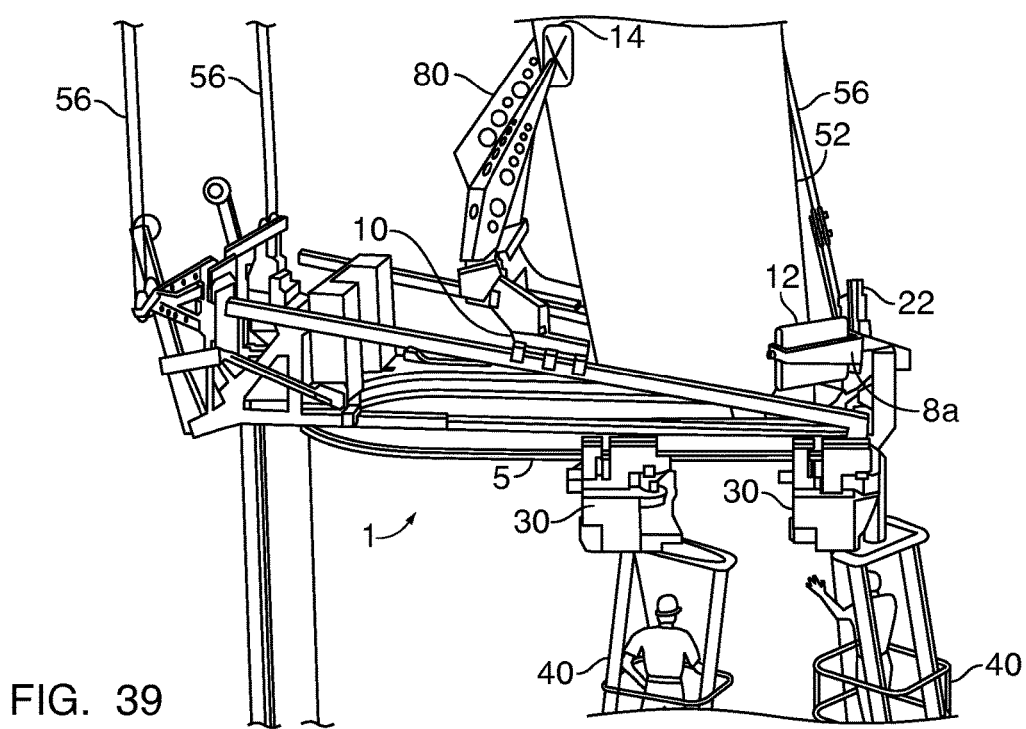

As the device 1 moves upwards as shown in FIG. 36, the rear support arms 80 with the rear contact means 14 is moved towards the tower 52 and the rotor blade enters the inner space of the frame 2. As also shown in FIG. 34, the tower support arrangement, e.g. the tower support arm 72, may push the device further towards the rotor blade 54, until it is detected by a sensor arrangement at the front guide and support arrangement 8 that the rotor blade 54 is fully within the frame 2, whereafter the frame can be closed, e.g. the front support arms 8a and 8b with the front contact means 12 can be turned back to closed position, whereafter the frame is closed.

The tower support arrangement may now be retracted, whereafter the device 1 is supported by the front contact means 12 and the rear contact means 14, while hanging from the lines, wires, cables or the like 56. As explained previously, when moving up and down by means of the hoisting means 20 and 22, the front contact means 12 may be controlled by adjusting the angle of the front support arms 8a and 8b in order to achieve that the rotor blade is being supported against both of the front contact means 12, controlled by e.g. sensors placed along the front contact means 12. Further, as also explained above, the position of the rear contact means 14 may be controlled by means of the sensor arrangement at the rear guide and support arrangement. Further, as also explained above, the rear support arms 80 may be pivoted away from or towards the rotor blade 54 in order to achieve a desired (lateral) position of the device 1 in relation to the rotor blade 54 and/or in order to achieve an even or an acceptable distribution of the load exerted by the rear contact means on the rotor blade, based on input from e.g. strain gauges, weighing cells, etc. Other control arrangements and associated sensor/detector arrangements have been described above.

Figure 41:
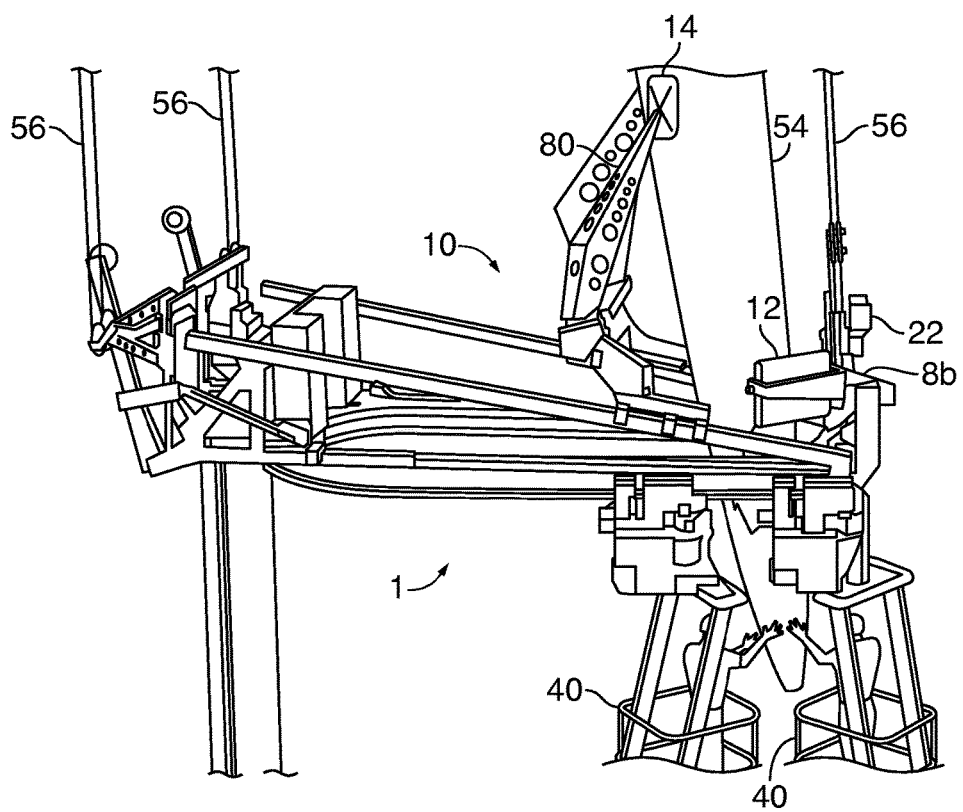

As shown in FIGS. 37, 38, 39 and 41, the device 1 may now be moved up and down the rotor blade 52, while the work platforms 40, carried by the trolleys 30 on the track 5, may be moved to any desired position, allowing the person (s) to e.g. work on, inspect etc. any part of the rotor blade 54 on any side of the rotor blade, even the tip of the rotor blade 54 as shown in FIG. 41. During the movement, the rear guide and support arrangement 10 is controlled accordingly.

It is noted that at the position shown for example in FIG. 41, a work platform 40 may not be allowed to pass along the part of the track near the tower, since the weight of the work platform and the person in it may create an undesired unbalance in relation to the support established to the rotor blade. The control system of the device 1 may automatically prohibit that a work platform is moved in such an undesired manner, e.g. by prohibiting certain movements for certain positions of the rear guide and support arrangement 10. For example, when as shown in FIG. 41 both platforms 40 are positioned on the same side of the rotor blade 54, it may not be possible for one of the work platforms 40 to pass along the track 5 to the other side, before the device 1 has been moved upwards to a position, where the rear contact means 14 have been moved further towards the tower.

Figure 40:
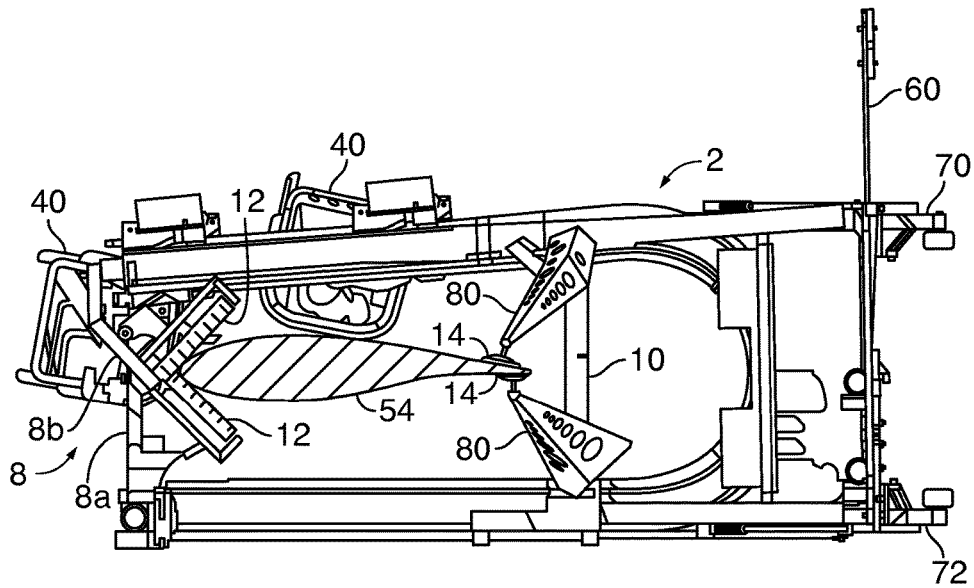

This is also illustrated in FIG. 40, where the device 1 is shown from above.

Figure 42:
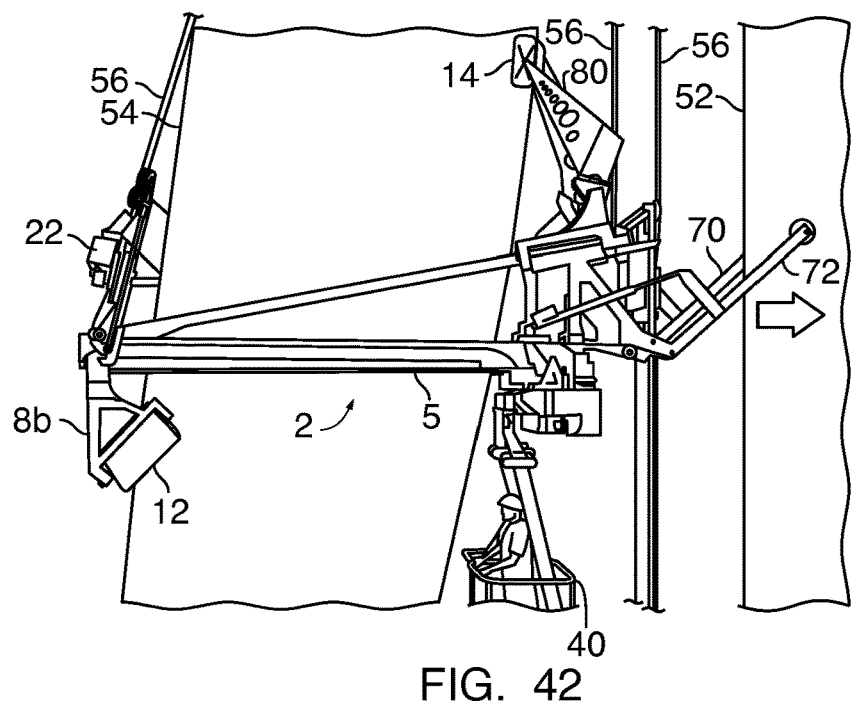
Figure 43:
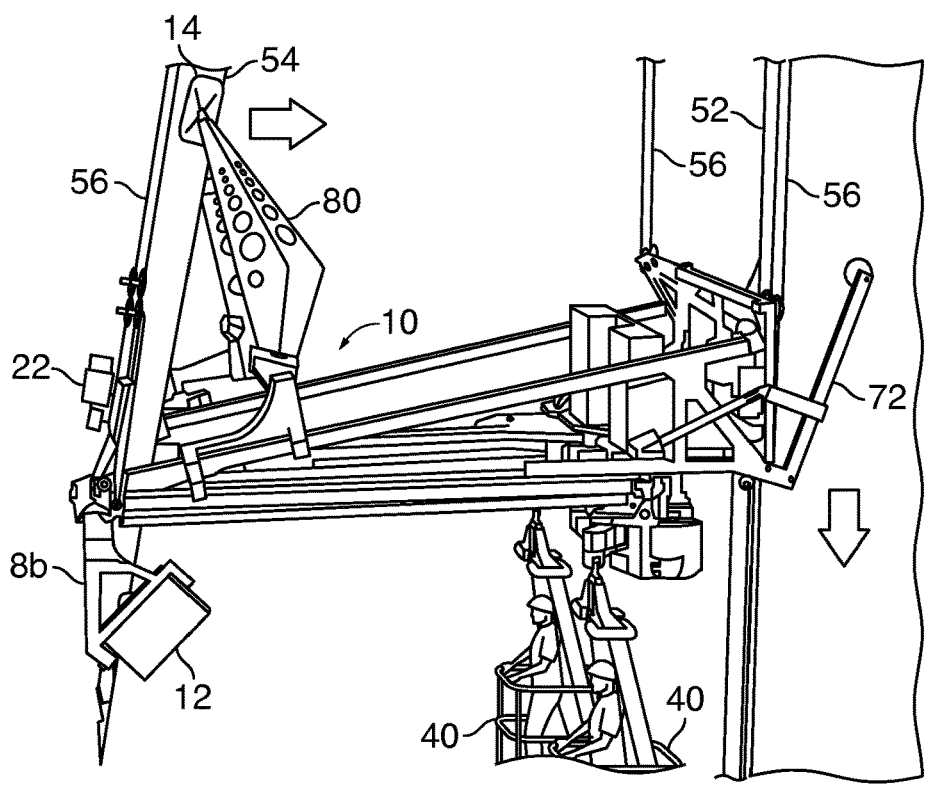
Figure 44:
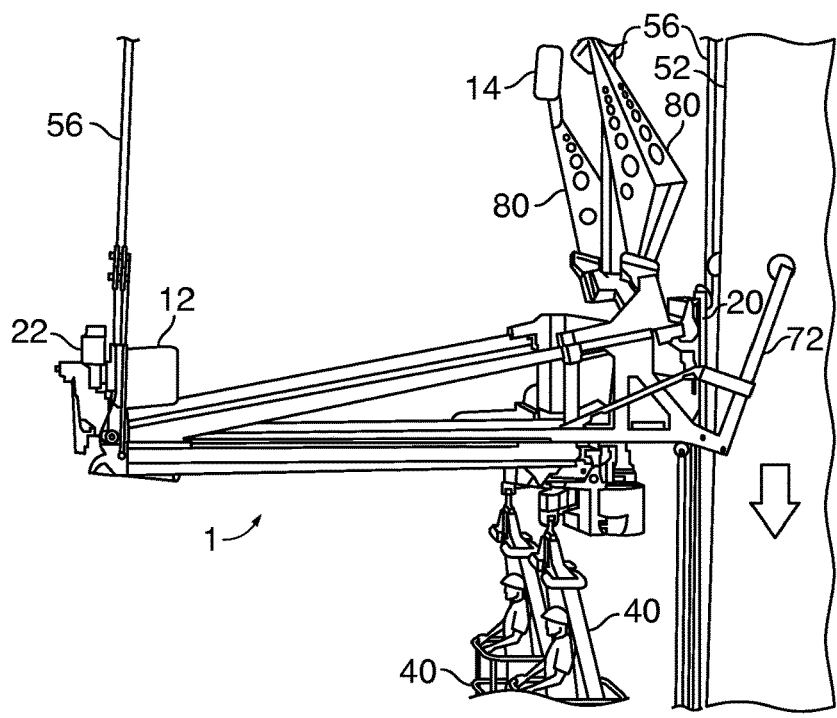

When the work, inspection, etc. has been performed as shown in FIG. 42, the device 1 is brought to a level, for example the "chord max"-level or any other suitable level, where it will be possible for the tower support arrangement, e.g. the tower support arms 70 and 72, to support against the tower 52, whereafter the rear contact arms 8a and 8b may be turned e.g. 90° in different directions, whereby the frame of the device is opened. The device may now be allowed to be moved downwards and/or the tower support arrangement is controllably retracted, allowing the device 1 to come nearer to the tower 52 as shown in FIG. 43. During this operation the rear guide and support arrangement 10 is controlled to maintain the desired contact to the above-mentioned regions of the rotor blade 54, until the rear guide and support arrangement 10 is at its end position as shown in FIG. 43. Here, the device will be supported entirely by the tower support arrangement, until it has reached a position near the ground as shown in FIG. 44. As mentioned above, the control system of the device is equipped with a security system, which will limit the speed of the hoisting means, when a certain level has been reached in order to avoid a collision with the ground (or any other object).

If the other rotor blades are to be inspected, repaired, etc., the device 1 is kept in the position shown in FIG. 44 (or at a higher position), until the rotor has been moved sufficiently for the next rotor blade to be pointing downwards, the rotor is stopped and blocked, whereafter the device may moved up along the tower 52 again, etc.

Figure 45:
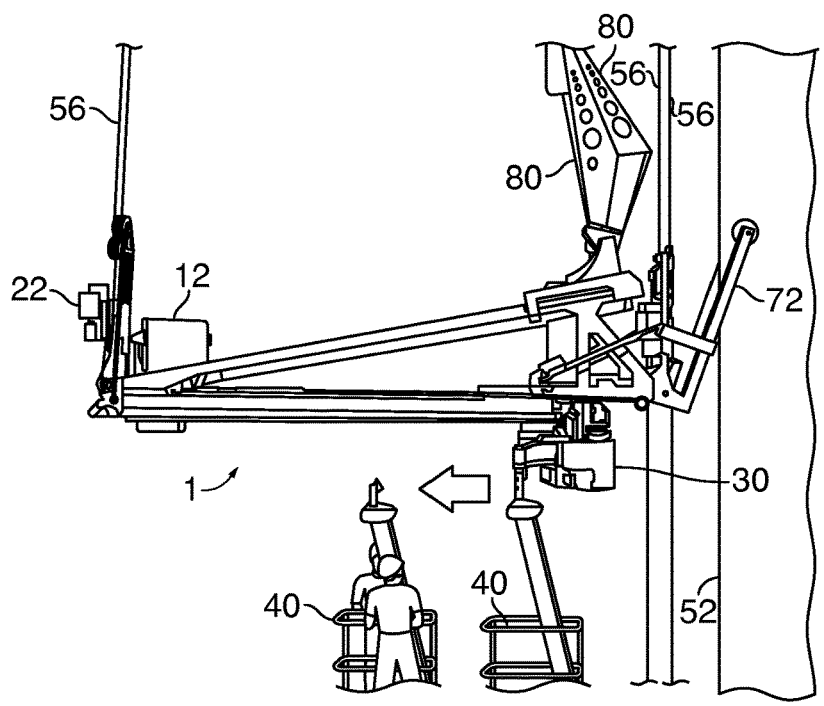
Figure 46:
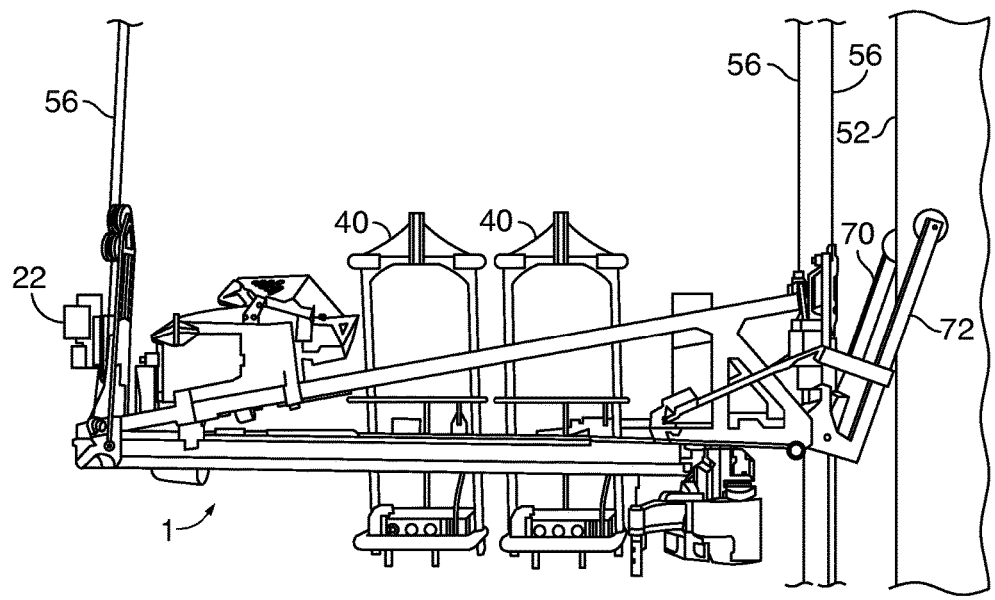

In FIG. 45, it is shown that the device has been stopped near the ground, where the device is being prepared for being placed on the trailer 140 again, e.g. by removing the work platforms 40 and placing these in a transport location as shown in FIG. 46, by laying the support arms 80 down, etc.

Figure 47:
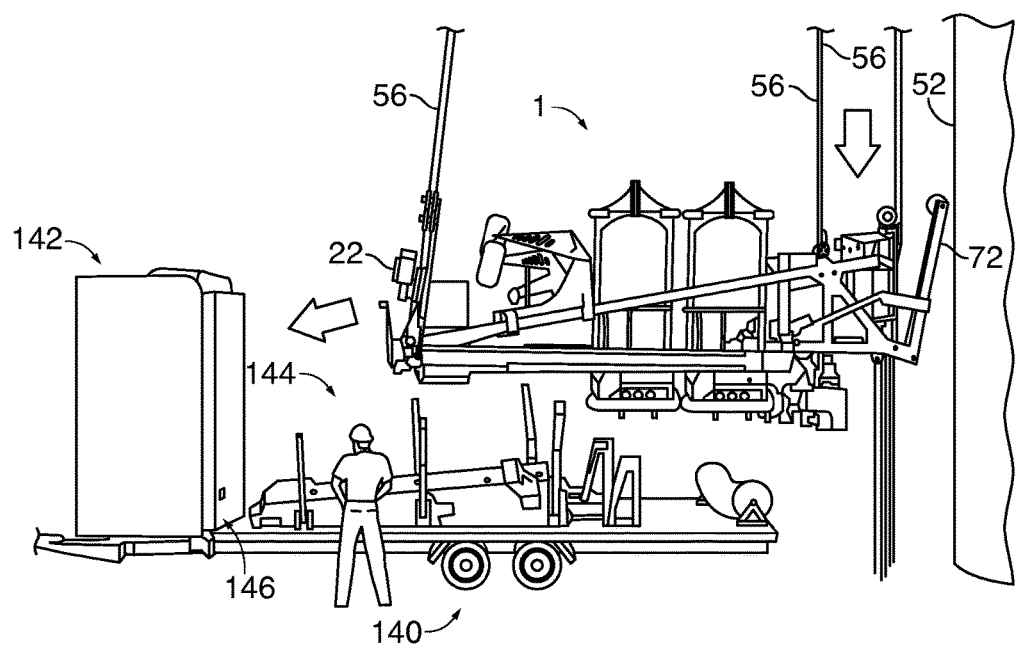

As shown in FIG. 47, the trailer 140 is moved to a suitable position, the line, cable or wire 144 is connected to the device 1, and by combined control of the winch 146 and the hoisting means 20 and 22, the device can be moved to and placed on the trailer 140, where the lines, cables, wires or the like 56 are removed, etc., the trailer covering 142 is closed, etc, whereafter the device can be transported to another wind turbine for further work.

Furthermore, it is noted that the functioning of the device 1 has primarily been explained in connection with one or more work platform, gondolas or the like, where these have been used by one or more workers and controlled by these. However, it will be understood that the control can also be performed at e.g. ground level and that e.g. a person in a master platform may control the operation of a slave platform or a slave unit that may for example perform a job in a more or less automated manner. Further, it will be understood that the device 1 may perform in an automated or semi-automated manner, for example without any persons situated in or at the device. Thus, the one or more objects carried by the device in its track may thus be operative units, designed for performing a work operation, possibly controlled from ground level and controlled by a control system, which receives input from e.g. sensors, vision systems, etc. which will be apparent for a person skilled within the field of robotics, automation etc.

Furthermore, it is noted that the device described above in addition to hoisting means etc. comprise a number of actuators, motors, etc. and that these may be designed in numerous manners and in accordance with the practice within the relevant field. Thus, these may be designed as pneumatically or hydraulically driven means and further they may be designed as electric/electronically driven means, which will be apparent to a skilled person.

Moreover, the control of the device may preferably as mentioned above take place by remote control and in this respect it is noted that wireless communication may be used extensively for the control system, also as regards the transmission of sensor signals, measured signals, control signals etc, that are being communicated between the respective units and elements of the device and units located e.g. at ground level, wind turbine level etc.

While the present invention has been illustrated and described with respect to a particular embodiment thereof, it should be appreciated by those of ordinary skill in the art that various modifications to this invention may be made without departing from the spirit and scope of the present.

What is claimed is:

1. A device for enabling access to a rotor blade of a wind turbine, said device being adapted for being moved in the longitudinal direction of the rotor blade, the device comprising:
   a frame structure,
   means for lowering or lifting the device in relation to the rotor blade, and
   at least one guide and support arrangement supporting and guiding the device in relation to the rotor blade comprising at least one arm configured to contact the rotor blade at regions at or near at least one of a front edge of the rotor blade or a rear edge of the rotor blade,
      wherein the at least one arm of the at least one guide and support arrangement is adjustable to the rotor blade in order to maintain controllable contact at said regions during movement of the device, and
      wherein said at least one guide and support arrangement comprises a plurality of contact means that maintain the controllable contact at said regions at or near at least one of the front edge or the rear edge of the rotor blade, wherein at least one of the contact means of the plurality of contact means is adapted to maintain controllable contact by both contacting the rotor blade at a plurality of points and being omnidirectionally movable along a surface of the rotor blade to support and guide the device in relation to the rotor blade while said at least one guide and support arrangement is being adjusted to the rotor blade during movement of the device in the longitudinal direction of the rotor blade.

2. The device according to claim 1, wherein at least one of said contact means comprise brush support means for contacting the rotor blade.

3. The device according to claim 1, wherein at least one of said contact means comprise belt, drum, or roller means for contacting the rotor blade.

4. The device according to claim 3, wherein said belt, drum, or roller means for contacting the rotor blade comprises a plurality of parallel belts, chains, drums, or rollers.

5. The device according to claim 1, wherein at least one of said contact means comprise a plurality of balls or rollers.

6. The device according to claim 1, wherein at least one of said contact means comprise fluid means in the form of liquid, pneumatic or air cushioning means for facilitating contact to the surface of the rotor blade.

7. The device according to claim 1, wherein said at least one guide and support arrangement comprises means for determining contact load at said regions of the rotor blade, thereby facilitating detection and measurement of unbalance and variations in rotor blade dimensions.

8. The device according to claim 7, wherein the device comprises control means for controlling said at least one guide and support arrangement on the basis of at least one of input signals provided by said means for determining contact load at said regions of the rotor blade and input signals provided by said means for detecting an edge of the rotor blade.

9. The device according to claim 1, wherein said at least one guide and support arrangement comprises means for detecting an edge of the rotor blade.

10. The device according to claim 9, wherein said means for detecting an edge of the rotor blade comprises measuring or detecting means including at least one of optical sensing means, radiation means, sonic detecting means and radar means.

11. The device according to claim 1, wherein said at least one guide and support arrangement comprises a rear arm for establishing contact at said regions at or near the rear edge of the rotor blade.

12. The device according to claim 1, wherein said at least one guide and support arrangement comprises a front guide and support arrangement comprising one or more of said plurality of contact means, and wherein said front guide and support arrangement is movable for facilitating opening and closing of said frame structure.

13. The device according to claim 12, wherein said front guide and support arrangement includes at least one pivotable arm.

14. The device according to claim 1, wherein at least one of said plurality of contact means is adapted for contacting the rotor blade at adjoining points.

15. A method for enabling access to a rotor blade of a wind turbine with the device according to claim 1, the method comprising:

placing the device near said wind turbine essentially at ground or sea level;

lifting the device in relation to said wind turbine by means of at least one line or wire connected to said wind turbine;

contacting the rotor blade by at least one arm of at least one guide and support arrangement at regions at or near at least one of a front edge of the rotor blade and a rear edge of the rotor blade when the device has reached a suitable level, the at least one arm being movable in relation to said device; and lifting or lowering the device in relation to the rotor blade while supported and guided by said at least one guide and support arrangement at regions at or near at least one of the front edge of the rotor blade and the rear edge of the rotor blade;

wherein said at least one guide and support arrangement comprises a plurality of contact means, at least one of which is at least one guide and support arrangement being adjusted to the rotor blade during movement of the device.

16. A method for enabling access to a rotor blade of a wind turbine with the device according to claim 1, the method comprising:

placing the device near said wind turbine essentially at ground or sea level, lifting the device in relation to said wind turbine by means of at least one line or wire connected to said wind turbine, contacting the rotor blade by at least one arm of at least one guide and support arrangement at an edge of the rotor blade when the device has reached a suitable level, the at least one arm being movable in relation to said device, contacting the rotor blade at a higher level by the at least one guide and support arrangement at both edges of the rotor blade, and lifting or lowering the device in relation to the rotor blade while supported and guided by said at least one guide and support arrangement at regions at or near the front edge of the rotor blade and at or near the rear edge of the rotor blade, wherein said at least one guide and support arrangement comprises a plurality of contact means, at least one of which is omnidirectionally movable along the surface of the rotor blade while said at least one guide and support arrangement is being adjusted to the rotor blade during movement of the device.

17. The method according to claim 16, wherein at least one object in the form of a work platform, a gondola, a tool, a robot or an apparatus is attached to a track portion of said device before lifting said device in relation to the wind turbine.

* * * * *